(12) United States Patent
Hayashi

(10) Patent No.: US 9,964,748 B2
(45) Date of Patent: May 8, 2018

(54) SAMPLE IMAGE DATA GENERATING APPARATUS AND SAMPLE IMAGE DATA GENERATING METHOD

(71) Applicant: OLYMPUS CORPORATION, Shibuya-ku, Tokyo (JP)

(72) Inventor: Shinichi Hayashi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 40 days.

(21) Appl. No.: 14/696,121

(22) Filed: Apr. 24, 2015

(65) Prior Publication Data

US 2015/0317824 A1    Nov. 5, 2015

(30) Foreign Application Priority Data

May 2, 2014    (JP) ................................. 2014-094937

(51) Int. Cl.
*G02B 21/16*    (2006.01)
*G06T 5/00*    (2006.01)
(Continued)

(52) U.S. Cl.
CPC ......... *G02B 21/16* (2013.01); *G02B 21/0032* (2013.01); *G02B 21/0056* (2013.01);
(Continued)

(58) Field of Classification Search
CPC ............ G02B 21/0032; G02B 21/0056; G02B 21/0076; G02B 21/0088; G02B 21/16;
(Continued)

(56) References Cited

U.S. PATENT DOCUMENTS 8,570,650 B2    10/2013  Dougherty et al.
2011/0194175 A1*   8/2011  Dougherty ......... G01N 21/6458
                                                     359/386
(Continued)

FOREIGN PATENT DOCUMENTS

DE    102010026205 A1    1/2012
JP      2012078408 A     4/2012
JP      2013513823 A     4/2013

OTHER PUBLICATIONS

Gustafsson et al., "Three-Dimensional Resolution Doubling in Wide-Field Fluorescence Microscopy by Structured Illumination", Biophysical Journal, vol. 94, Jun. 2008, pp. 4957-4970.*
(Continued)

*Primary Examiner* — Reza Aghevli
(74) *Attorney, Agent, or Firm* — Holtz, Holtz & Volek PC

(57) ABSTRACT

A sample image data generating apparatus includes a modulated image imager that picks up a modulated image that is a sample image modulated by structured illumination forming an illumination pattern having a periodic structure in an optical axis direction of an objective and an orthogonal direction orthogonal to the optical axis direction. The sample image data generating apparatus further includes a demodulated image data generator that generates demodulated image data by calculating a demodulated image according to a plurality of modulated images each picked up by the modulated image imager when the illumination pattern is located at a different position on sample with respect to the optical axis direction and the orthogonal direction and according to a defocusing amount of the structured illumination with reference to a focal plane of the objective, the demodulated image being a sample image obtained by demodulating the modulated image.

10 Claims, 36 Drawing Sheets

(51) Int. Cl.
*G02B 21/00* (2006.01)
*G06T 15/40* (2011.01)
*G06T 3/40* (2006.01)
*G02B 21/36* (2006.01)

(52) U.S. Cl.
CPC ..... *G02B 21/0076* (2013.01); *G02B 21/0088* (2013.01); *G02B 21/367* (2013.01); *G06T 3/4053* (2013.01); *G06T 5/002* (2013.01); *G06T 15/405* (2013.01); *G06T 2207/10056* (2013.01); *G06T 2207/10152* (2013.01); *G06T 2207/20056* (2013.01)

(58) Field of Classification Search
CPC ............... G02B 21/367; G06T 15/405; G06T 2207/10056; G06T 2207/10152; G06T 2207/20056; G06T 3/4053; G06T 5/002; G06T 7/0057
See application file for complete search history.

(56) References Cited

U.S. PATENT DOCUMENTS

| 2012/0008197 | A1* | 1/2012 | Borck | G02B 21/06 359/386 |
|---|---|---|---|---|
| 2012/0026311 | A1* | 2/2012 | Ouchi | G02B 21/06 348/79 |
| 2012/0081535 | A1 | 4/2012 | Hayashi et al. | |
| 2014/0036057 | A1 | 2/2014 | Hayashi et al. | |
| 2014/0104407 | A1* | 4/2014 | Ouchi | G02B 21/14 348/79 |
| 2014/0313576 | A1* | 10/2014 | Uhl | G02B 21/14 359/385 |
| 2016/0124208 | A1* | 5/2016 | Best | G02B 21/0076 359/363 |
| 2016/0131885 | A1* | 5/2016 | Nakayama | G01N 21/6428 250/458.1 |
| 2016/0216505 | A1* | 7/2016 | Okudaira | G02B 21/0076 |

OTHER PUBLICATIONS

Mats G. L. Gustafsson, et al., "Three-Dimensional Resolution Doubling in Wide-Field Fluorescence Microscopy by Structured Illumination", Biophysical Journal, vol. 94, Jun. 2008, pp. 4957-4970.

* cited by examiner

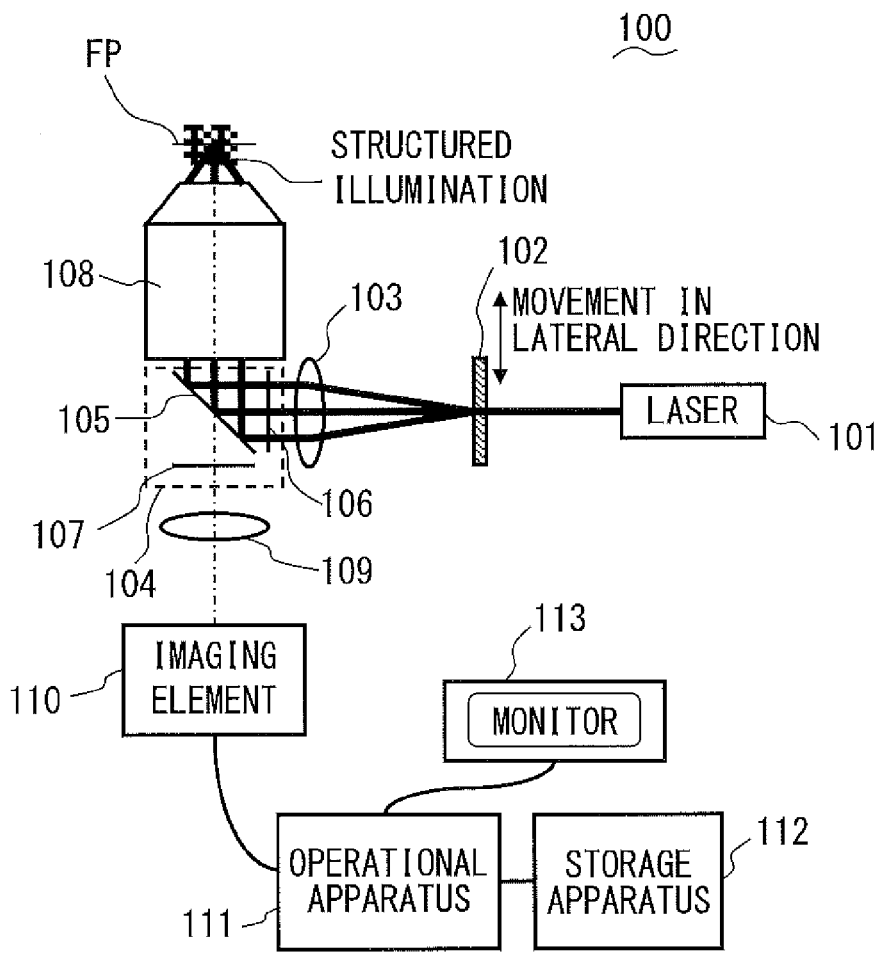
F I G. 1

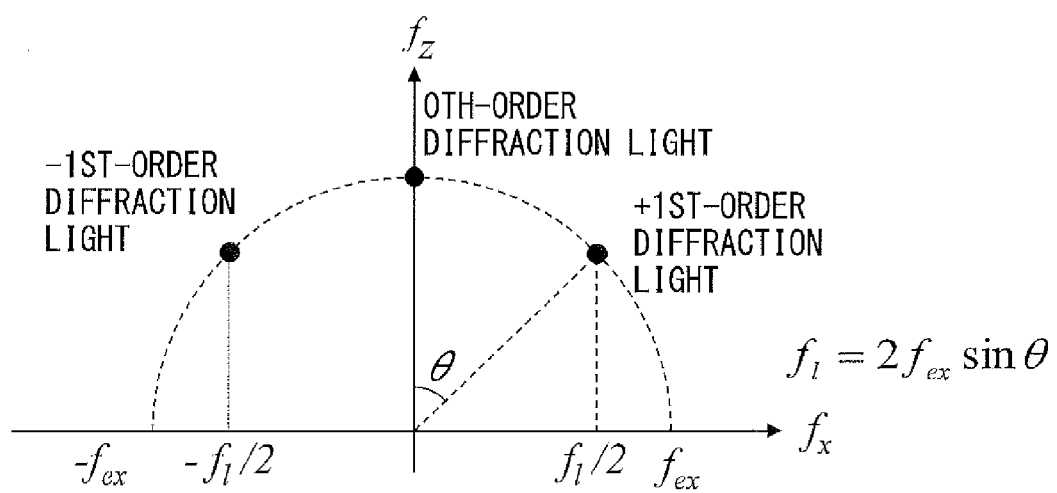
F I G. 3

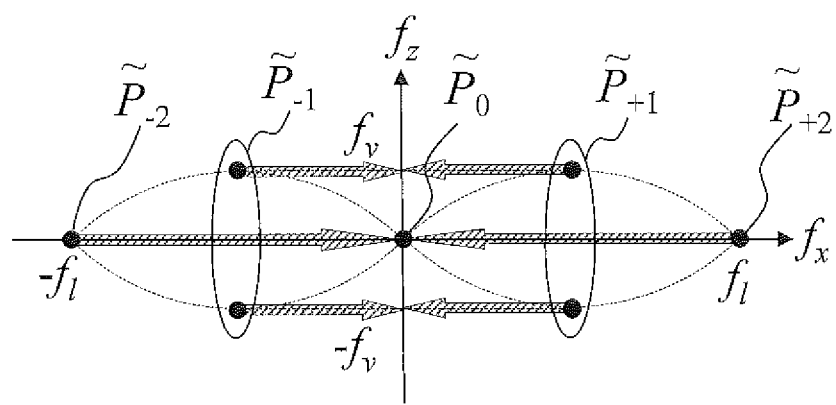
F I G. 6

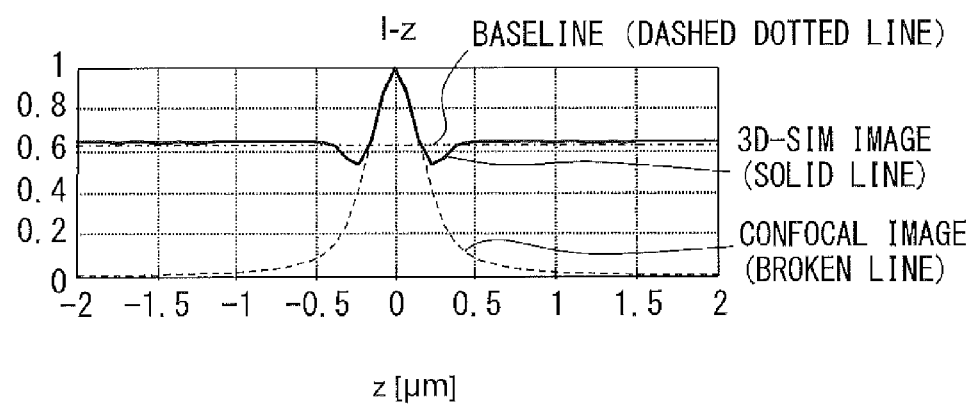
F I G. 9

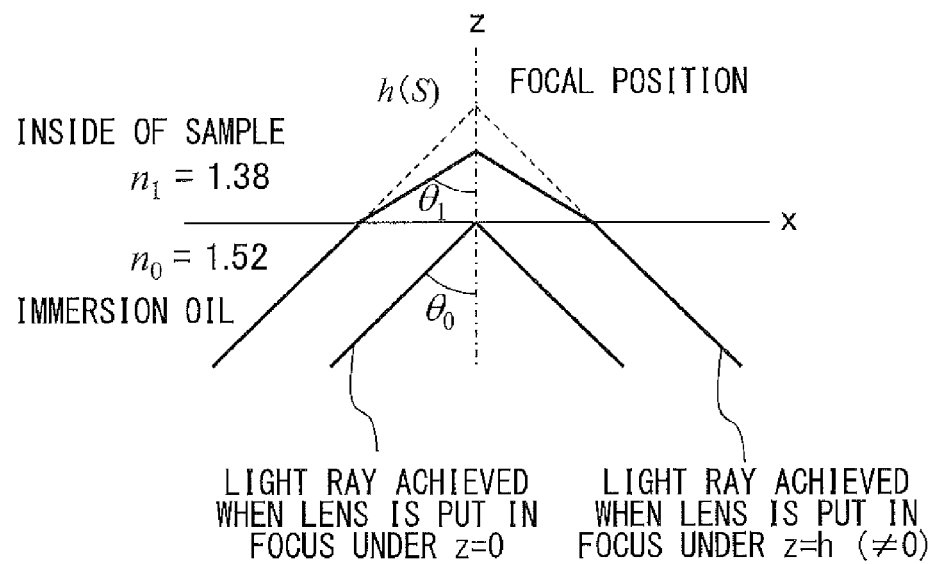
F I G. 1 2

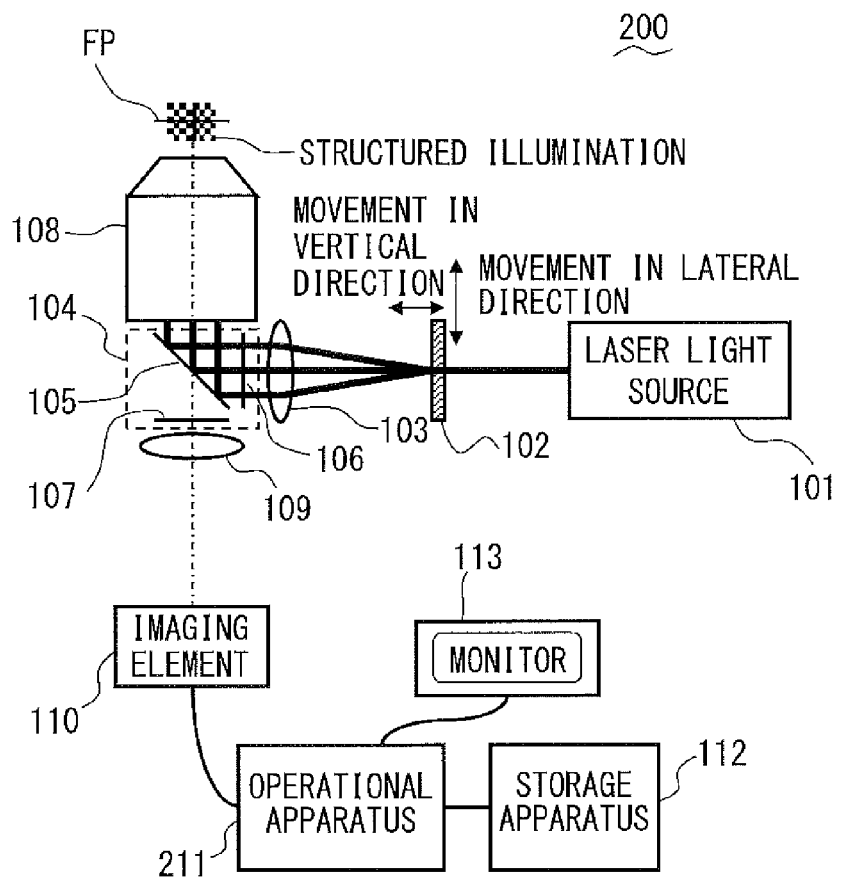
F I G. 1 6

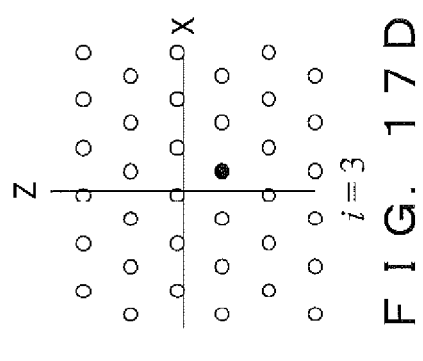
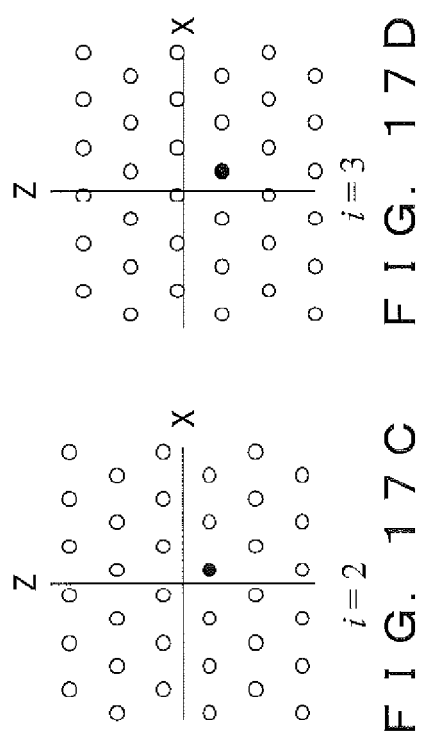
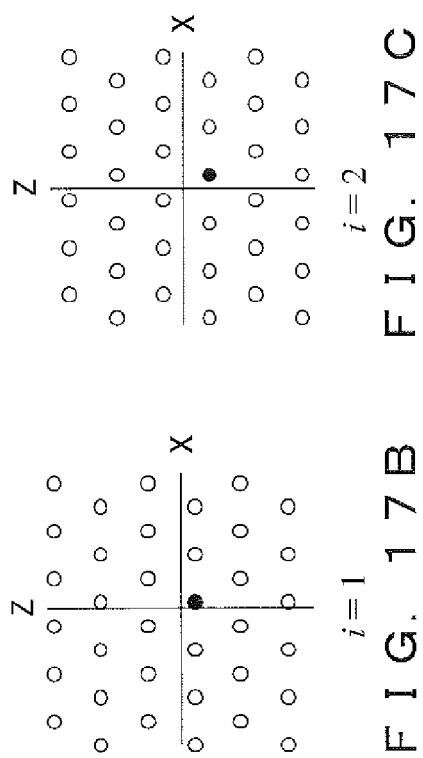
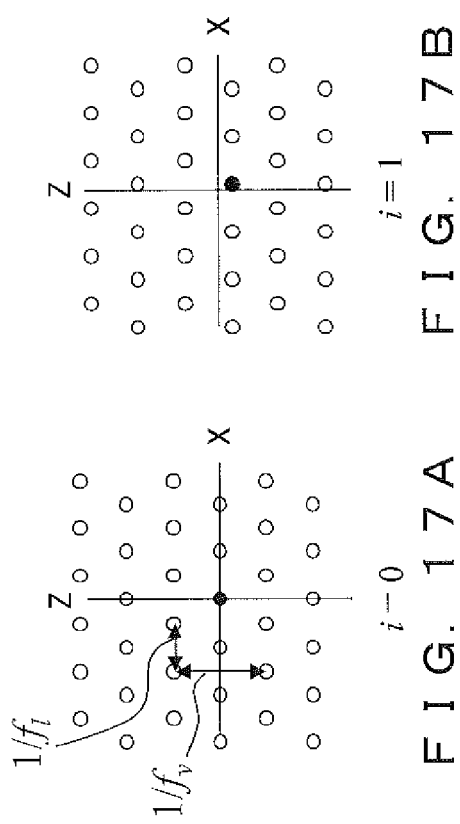
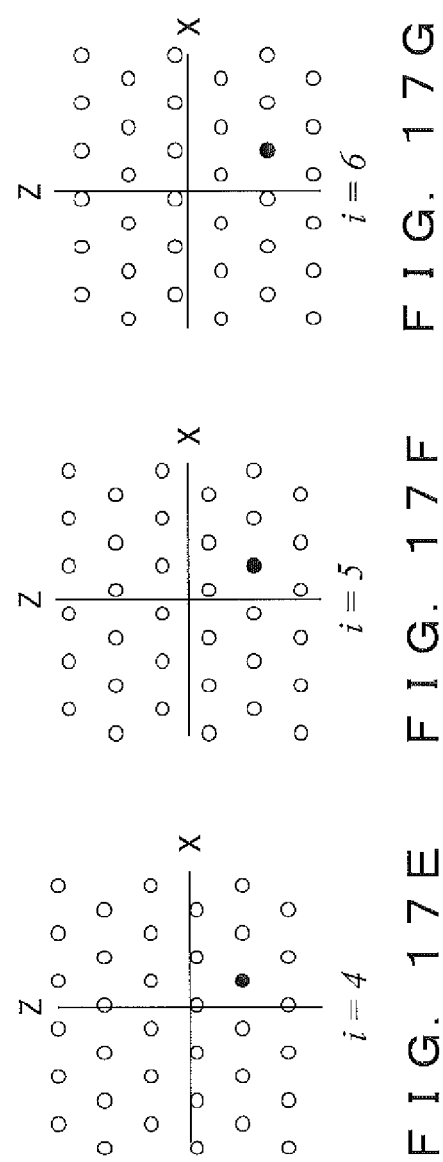
FIG. 17A  FIG. 17B  FIG. 17C  FIG. 17D
FIG. 17E  FIG. 17F  FIG. 17G

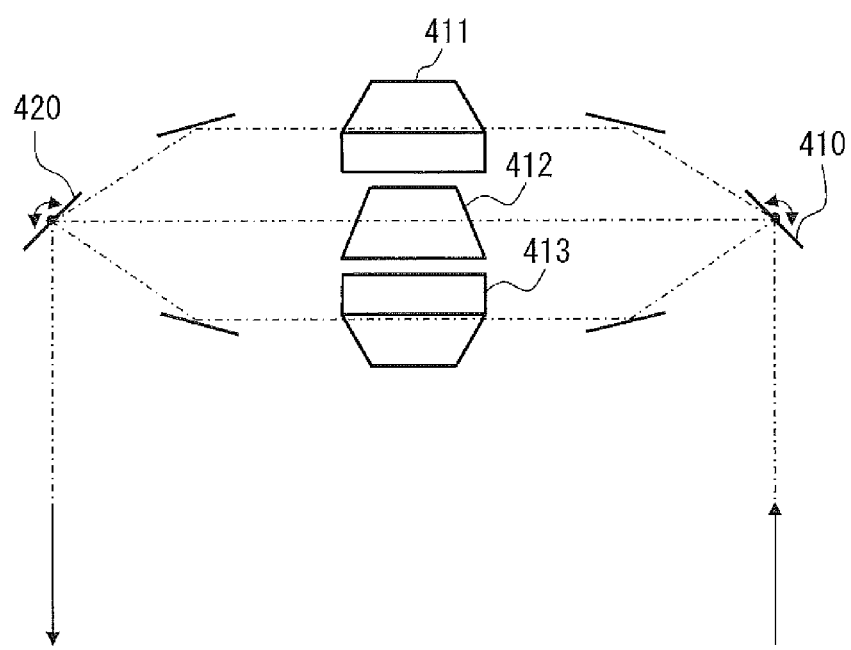
F I G. 26

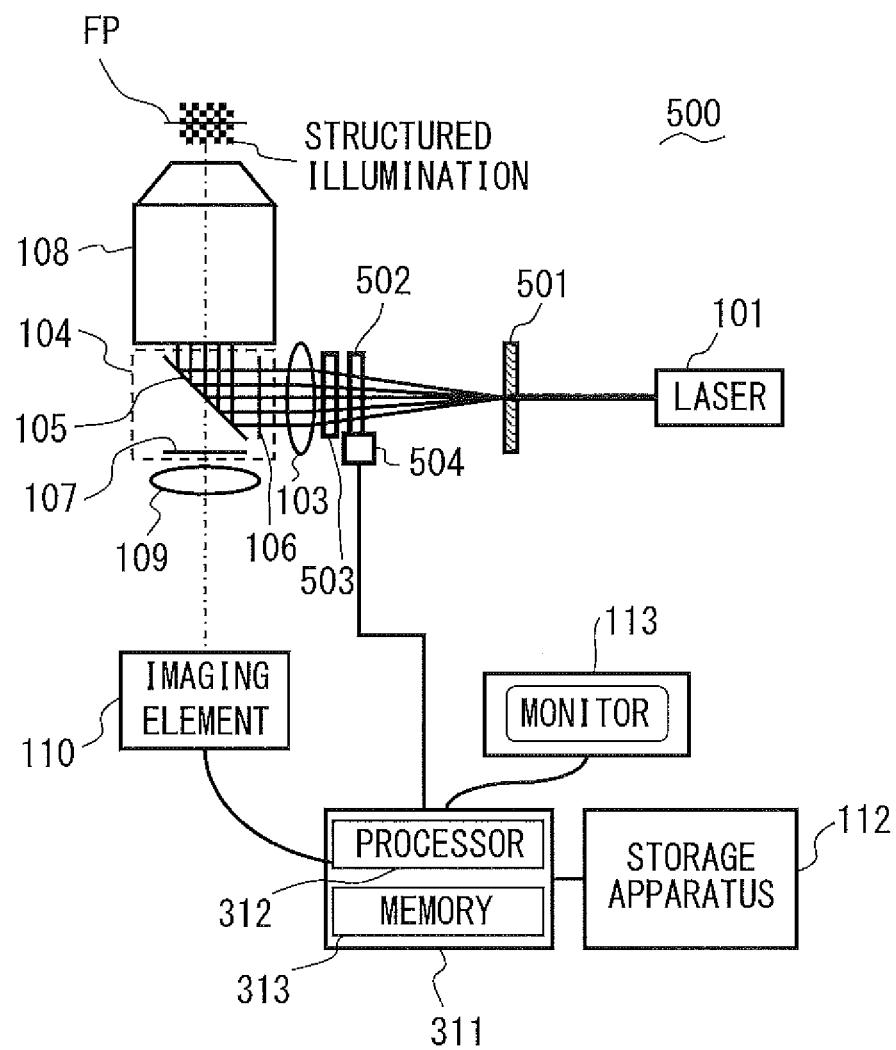
F I G. 29

TWO-DIMENSIONAL
DIFFRACTION
GRATING

PHASE DIFFERENCE
GENERATION PLATE

PUPIL PLANE OF
OBJECTIVE

SAMPLE IMAGE DATA GENERATING APPARATUS AND SAMPLE IMAGE DATA GENERATING METHOD

CROSS REFERENCE TO RELATED APPLICATIONS

This application is based upon and claims the benefit of priority from prior Japanese Patent Application No. 2014-094937, filed May 2, 2014, the entire contents of which are incorporated herein by this reference.

BACKGROUND OF THE INVENTION

Field of the Invention

The present invention relates to a sample image data generating apparatus and a sample image data generating method, and particularly relates to a sample image data generating apparatus and sample image data generating method based on structured illumination microscopy.

Description of the Related Art

Structured Illumination Microscopy (hereinafter referred to as SIM) is a known super-resolution technique for obtaining images of a sample (hereinafter referred to as sample images) with a resolution exceeding the resolution limit of an imaging optical system (hereinafter referred to as a super resolution).

In a typical wide-field observation, a sample is irradiated with illumination light that is as uniform as possible. In SIM, by contrast, an illumination pattern, which is mainly a stripe pattern, is formed on a sample so as to generate sample image data having a super resolution exceeding the resolution limit of an imaging optical system.

In recent years, an SIM has been proposed that forms a three-dimensional-structure illumination pattern that includes a stripe pattern not only in an X direction orthogonal to an optical axis but also in a Z direction parallel to the optical axis (hereinafter referred to as 3D-SIM). Such a technology is disclosed by, for example, U.S. Patent Application Publication No. 2011/0194175.

SUMMARY OF THE INVENTION

An aspect of the present invention provides a sample image data generating apparatus that includes: a modulated image imager that picks up a modulated image that is a sample image modulated by structured illumination forming an illumination pattern having a periodic structure in an optical axis direction of an objective and an orthogonal direction orthogonal to the optical axis direction; and a demodulated image data generator that generates demodulated image data by calculating a demodulated image according to a plurality of modulated images each picked up by the modulated image imager when the illumination pattern is located at a different position on a sample with respect to the optical axis direction and the orthogonal direction and according to a defocusing amount of the structured illumination with reference to a focal plane of the objective, the demodulated image being a sample image obtained by demodulating the modulated image.

Another aspect of the present invention provides a sample image data generating apparatus that includes: a modulated image imager that picks up a modulated image that is a sample image modulated by structured illumination forming an illumination pattern having a periodic structure in an optical axis direction of an objective and an orthogonal direction orthogonal to the optical axis direction; a demodulated image data generator that generates demodulated image data by calculating a demodulated image according to a plurality of modulated images each picked up by the modulated image imager when the illumination pattern is located at a different position on a sample with respect to the optical axis direction and the orthogonal direction and according to a correction coefficient for correcting defocusing of the structured illumination with reference to a focal plane of the objective, the demodulated image being a sample image obtained by demodulating the modulated image; a display that displays, according to the demodulated image data, the demodulated image calculated by the demodulated image data generator; and a demodulated image data regenerator that regenerates demodulated image data by changing the correction coefficient.

Still another aspect of the invention provides a sample image data generating method including: moving an illumination pattern in an optical axis direction of an objective and an orthogonal direction orthogonal to the optical axis direction, the illumination pattern having a periodic structure in the optical axis direction and the orthogonal direction; picking up a modulated image that is a sample image modulated by structured illumination forming the illumination pattern; and generating demodulated image data by calculating a demodulated image according to a plurality of modulated images each picked up when the illumination pattern is located at a different position on a sample with respect to the optical axis direction and the orthogonal direction and according to a defocusing amount of the structured illumination with reference to a focal plane of the objective, the demodulated image being a sample image obtained by demodulating the modulated image.

BRIEF DESCRIPTION OF THE DRAWINGS

The present invention will be more apparent from the following detailed description when the accompanying drawings are referenced.

FIG. 1 illustrates the configuration of a conventional apparatus used in 3D-SIM;

FIG. 3 illustrates spatial frequencies of 0th-order diffraction light and ±1st-order diffraction light, all incident on a focal plane;

FIG. 6 illustrates demodulation of a modulated image component according to 3D-SIM;

FIGS. 8A-8D illustrate a simulation result of 3D-SIM, wherein FIG. 8A depicts an intensity distribution of three-dimensional-structure illumination, FIG. 8B depicts a PSF in wide-field fluorescence illumination, FIG. 8C depicts a PSF in 3D-SIM, and FIG. 8D depicts, for reference, a PSF in a confocal observation based on a confocal mask on which a pinhole aperture is formed;

FIG. 9 illustrates a comparison between an I-z curve obtained through 3D-SIM and an I-z curve obtained through a confocal observation;

FIG. 12 illustrates an optical path length difference caused by an index mismatch specific to an oil immersion objective;

FIG. 16 illustrates the basic configuration of an apparatus used in R3D-SIM;

FIGS. 17A-17G illustrate a situation in which an illumination pattern moves in R3D-SIM, and each depict an illumination pattern achieved when a diffraction grating is located at a different position;

FIG. 26 illustrates a configuration in which the azimuth of an illumination pattern is changed using a plurality of image rotators;

FIG. 29 illustrates the configuration of an apparatus in accordance with embodiment 3;

FIGS. 30A-C illustrate a two-dimensional diffraction grating, a phase difference generation plate, and a pupil plane of an objective, all seen from a direction in which light travels, wherein FIG. 30A depicts the two-dimensional diffraction grating, FIG. 30B depicts the phase difference generation plate, and FIG. 30C depicts the pupil plane of an objective;

DESCRIPTION OF THE EMBODIMENTS

3D-SIM enables generation of sample image data with an improved Z-direction resolution in addition to an improved X-direction resolution. However, generating sample image data according to conventional 3D-SIM is likely to cause artifacts within a sample image. Hence, there is a need for a technique for suppressing a generation of artifacts in 3D-SIM.

The following will describe conventional 3D-SIM with reference to FIGS. 1-9.

Figure 2:
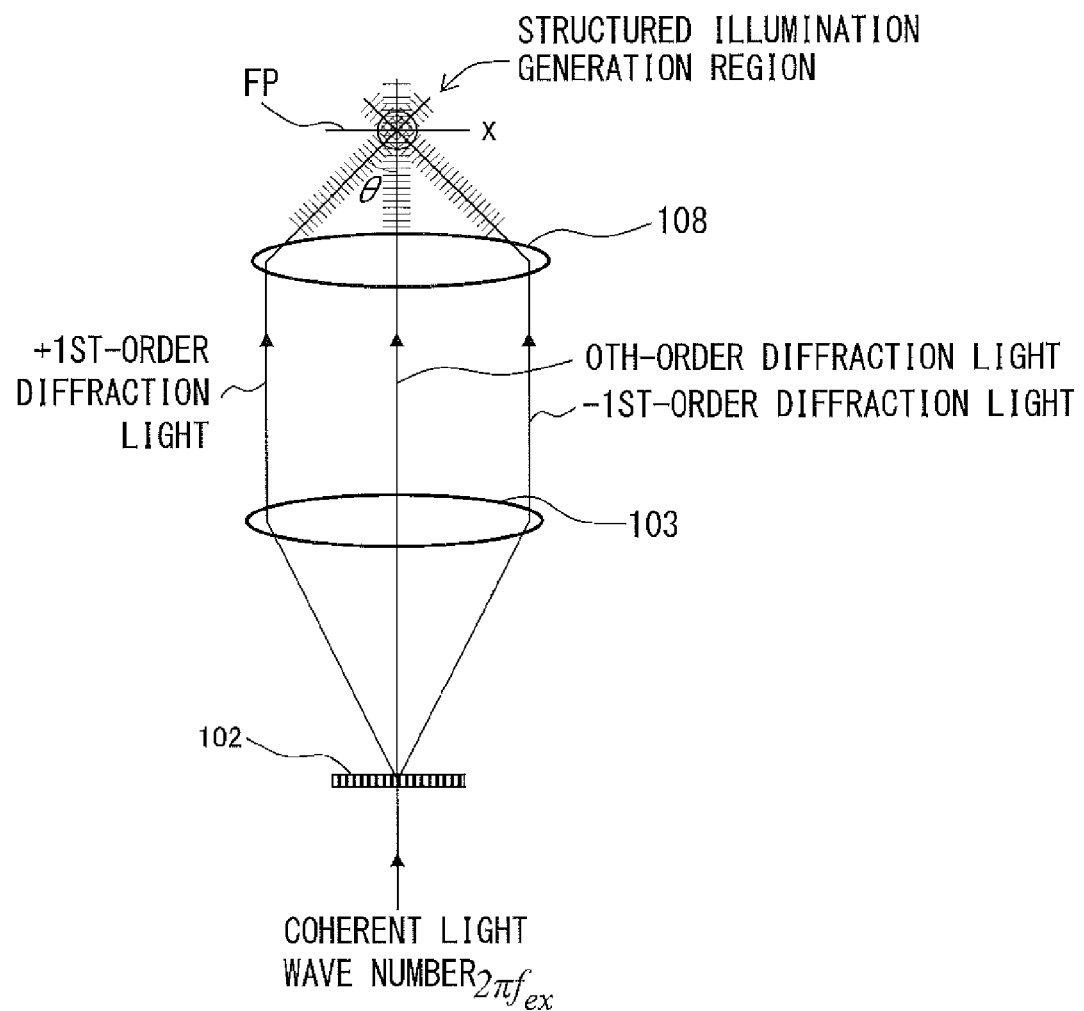
FIG. 2 illustrates structured illumination provided by the apparatus depicted in FIG. 1.
Figure 4:
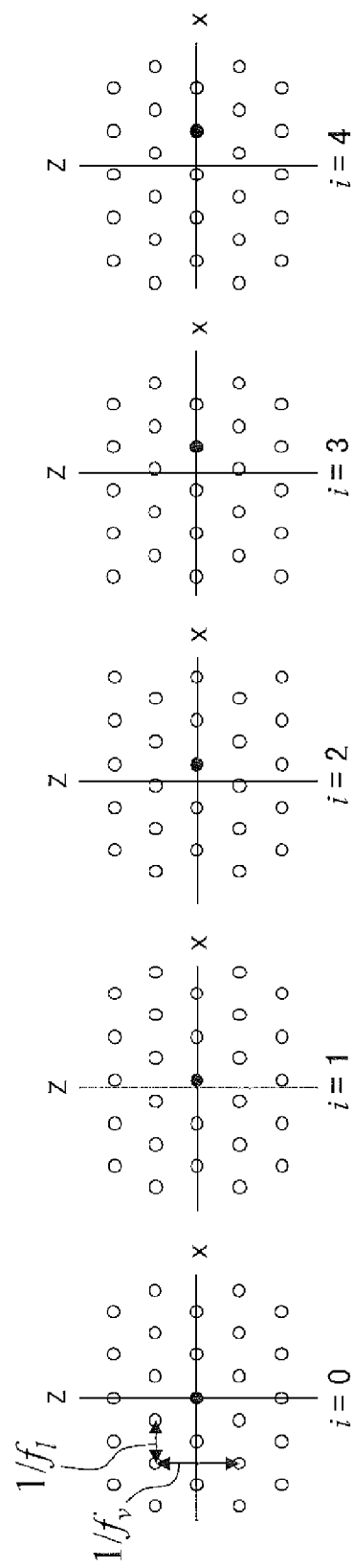
FIGS. 4A-4E illustrate a situation in which an illumination pattern moves in 3D-SIM, and each depict an illumination pattern achieved when a diffraction grating is located at a different position.

FIG. 1 illustrates the configuration of a conventional apparatus 100 used in 3D-SIM. FIG. 2 illustrates structured illumination provided by the apparatus 100. The apparatus 100 depicted in FIG. 1 moves a three-dimensional-structure illumination pattern in an X direction on a specified-distance by specified-distance basis so as to pick up a modulated image of a fluorescence sample (observed object) for each position after the movement. Image data of a demodulated image (demodulated image data) having a super resolution is generated from a plurality of (in particular, five) pieces of modulated image data obtained in such a way.

First, descriptions will be given of a method of generating a plurality of pieces of modulated image data by picking up a plurality of modulated images.

As depicted in FIGS. 1 and 2, laser light (coherent light) emitted from a laser 101 and having a wave number of $2\eta f_{ex}$ is divided by a diffraction grating 102 into three light beams composed of 0th-order diffraction light and ±1st-order diffraction light and is then incident on an illumination lens 103. Subsequently, the three light beams are focused on different positions on a pupil plane of the objective 108 via a fluorescence cube 104 (an excitation filter 106 and a dichroic mirror 105). Then, the objective 108 causes the light beams to be incident on a focal plane FP at different incident angles. Consequently, interference occurs between the three light beams, thereby forming a three-dimensional-structure illumination pattern in a region that includes the focal plane FP. That is, three-dimensional-structure illumination is generated. FIG. 3 illustrates spatial frequencies of 0th-order diffraction light and ±1st-order diffraction light, all incident on a focal plane. Note that $f_f = 2f_{ex} \sin \theta$, where θ indicates the incident angle of ±1st-order diffraction light.

Fluorescence emitted from a sample located at the focal plane FP is incident on a tube lens 109 via the objective 108 and the fluorescence cube 104 (the dichroic mirror 105 and a barrier filter 107), and is then focused on an imaging element 110. Accordingly, an enlarged image of the sample is projected onto the imaging element 110. The imaging element 110 picks up the sample image (modulated image) modulated by three-dimensional-structure illumination, and an operational apparatus 111 generates modulated image data.

In the apparatus 100, the diffraction grating 102 can move in a direction (lateral direction) orthogonal to a direction in which 0th-order diffraction light emitted from the diffraction grating 102 travels. The diffraction grating 102 moves in the lateral direction on a specified-amount by specified-amount basis. This causes the illumination pattern to move each time in an X direction orthogonal to an optical axis ⅕ of a basic cycle ($1/f_l$) that the illumination pattern has with reference to the X direction, as illustrated in FIGS. 4A-4E. Note that open circles in FIGS. 4A-4E indicate the positions of local maxima of illumination intensity within the illumination pattern and that blackened-in circles indicate a reference position within the illumination pattern. The apparatus 100 moves an illumination pattern in this way and picks up a sample image for each position after the movement, so as to generate five pieces of modulated image data.

The following will describe a method of generating demodulated image data from a plurality of pieces of modulated image data.

An intensity distribution $Ill_{3D\text{-}SIM,i}(x,z)$ of three-dimensional-structure illumination is expressed by, for example, formula (1). As depicted in FIGS. 4A-4E, i indicates an integer from 0 to 4; (x,z), spatial coordinates; $f_l$ and $f_v$, fundamental frequencies that the illumination pattern has with reference to X and Z directions. $f_{ex}$ indicates a frequency determined according to the wavelength of excitation light (laser light), and is the reciprocal of the wavelength of excitation light. $f_l$, $f_v$, and $f_{ex}$ satisfy formula (2).

$$Ill_{3D\text{-}SIM,i}(x,z) \equiv \qquad (1)$$

$$\frac{2}{3}\left|\exp[j2\pi f_{ex}z] + \frac{1}{2}\exp\left[j2\pi\left\{\left(\frac{f_l}{2}x + \frac{1}{5}i\right) + (f_{ex} - f_v)z\right\}\right] + \right.$$

$$\left.\frac{1}{2}\exp\left[j2\pi\left\{-\left(\frac{f_l}{2}x + \frac{1}{5}i\right) + (f_{ex} - f_v)z\right\}\right]\right|^2 =$$

$$1 + \frac{4}{3}\cos\left[2\pi\left(\frac{f_l}{2}x + \frac{1}{5}i\right)\right]\cos[2\pi f_v z] + \frac{1}{3}\cos\left[2\pi\left(f_l x + \frac{2}{5}i\right)\right]$$

$$f_v \equiv f_{ex} - \sqrt{f_{ex}^2 - \left(\frac{f_l}{2}\right)^2} \qquad (2)$$

The first, second, and third terms within the absolute value symbol on the first line of the right side of formula (1) express components of 0th-order diffraction light, +1st-order diffraction light, and −1st-order diffraction light.

Formulae (3)-(6) are obtained by applying Fourier transform to formula (1). Note that a tilde () indicates a function expressed using a spatial frequency obtained by applying Fourier transform to an original function.

$$\tilde{Ill}_{3D\text{-}SIM,i}(f_x, f_z) = \qquad (3)$$

$$\tilde{M}_0(f_x, f_z) + \exp\left[j2\pi\frac{1}{5}i\right]\tilde{M}_{+1}(f_x, f_z) + \exp\left[-j2\pi\frac{1}{5}i\right]\tilde{M}_{-1}(f_x, f_z) +$$

$$\exp\left[j2\pi\frac{2}{5}i\right]\tilde{M}_{+2}(f_x, f_z) + \exp\left[-j2\pi\frac{2}{5}i\right]\tilde{M}_{-2}(f_x, f_z)$$

$$\tilde{M}_0(f_x, f_z) = \delta(f_x)\delta(f_z) \qquad (4)$$

$$\tilde{M}_{\pm 1}(f_x, f_z) = \frac{1}{3}\delta\left(f_x \mp \frac{f_l}{2}\right)\{\delta(f_z - f_v) + \delta(f_z + f_v)\} \qquad (5)$$

$$\tilde{M}_{\pm 2}(f_x, f_z) = \frac{1}{6}\delta(f_x \mp f_l)\delta(f_z) \qquad (6)$$

Figure 5:
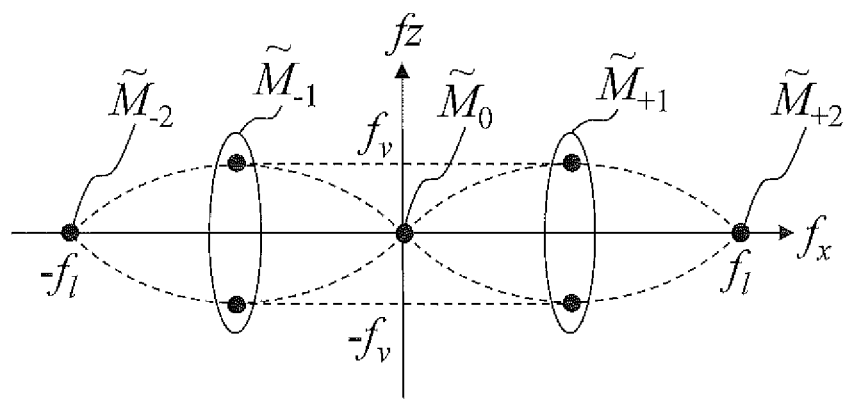
FIG. 5 illustrates a Fourier transform of an intensity distribution of structured illumination according to 3D-SIM.

As formula (3) indicates, three-dimensional-structure illumination consists of a linear combination of the following five modulated components also depicted in FIG. 5.

$$(\tilde{M}_0, \tilde{M}_{+1}, \tilde{M}_{-1}, \tilde{M}_{+2}, \tilde{M}_{-2})$$

Note that two elements that are different in an $f_z$ direction are combined into the following single component.

$$\tilde{M}_{+1}, \tilde{M}_{-1}$$

An intensity distribution $I_{3D\text{-}SIM,i}(x,z)$ of a modulated image projected onto the imaging element 110 is calculated as depicted in formula (7) by convolving a point spread function $PSF_{WF}(x,z)$ in a wide-field florescence observation to the product of a sample function $Obj(x,z)$ and an intensity distribution $Ill_{3D\text{-}SIM,i}(x,z)$ of three-dimensional-structure illumination. Note that $Obj(x,z)$ expresses a sample function indicating, for example, the distribution of fluorochrome within a sample and that $PSF_{WF}(x,z)$ expresses a point spread function in a wide-field florescence observation.

$$I_{3D\text{-}SIM,i}(x,z) = \{Ill_{3D\text{-}SIM,i}(x,z) \cdot Obj(x,z)\} * PSF_{WF}(x,z) \qquad (7)$$

In consideration of formulae (3)-(6), formulae (8)-(11) are obtained by applying Fourier transform to formula (7).

$$\tilde{I}_{3D\text{-}SIM,i}(f_x, f_z) = \qquad (8)$$

$$\tilde{P}_0(f_x, f_z) + \exp\left[j2\pi\frac{1}{5}i\right]\tilde{P}_{+1}(f_x, f_z) + \exp\left[-j2\pi\frac{1}{5}i\right]\tilde{P}_{-1}(f_x, f_z) +$$

$$\exp\left[j2\pi\frac{2}{5}i\right]\tilde{P}_{+2}(f_x, f_z) + \exp\left[-j2\pi\frac{2}{5}i\right]\tilde{P}_{-2}(f_x, f_z)$$

$$\tilde{P}_0(f_x, f_z) \equiv \tilde{Obj}(f_x, f_z) \cdot \tilde{PSF}_{WF}(f_x, f_z) \qquad (9)$$

$$\tilde{P}_{\pm 1}(f_x, f_z) \equiv \qquad (10)$$

$$\frac{1}{3}\left\{\tilde{Obj}\left(f_x \mp \frac{f_l}{2}, f_z - f_v\right) + \tilde{Obj}\left(f_x \mp \frac{f_l}{2}, f_z + f_v\right)\right\} \cdot \tilde{PSF}_{WF}(f_x, f_z)$$

$$\tilde{P}_{\pm 2}(f_x, f_z) \equiv \frac{1}{6}\tilde{Obj}(f_x \mp f_l, f_z) \cdot \tilde{PSF}_{WF}(f_x, f_z) \qquad (11)$$

As formula (8) indicates, a modulated image consists of a linear combination of the following five modulated image components also depicted in FIG. 6.

$$(\tilde{P}_0, \tilde{P}_{+1}, \tilde{P}_{-1}, \tilde{P}_{+2}, \tilde{P}_{-2})$$

Each individual modulated image component is an image component with the origin of frequencies shifted due to the influence of a corresponding modulated component.

Note that two image elements that are different in an $f_z$ direction are combined into the following one image component.

$$\tilde{P}_{+1}, \tilde{P}_{-1}$$

Formulae (9)-(11) indicate five modulated image components expressed using a spatial frequency. Formulae (12)-(14) indicate five modulated image components expressed using spatial coordinates.

$$P_0(x, z) \equiv Obj(x, z) * PSF_{WF}(x, z) \qquad (12)$$

$$P_{\pm 1}(x, z) \equiv \frac{2}{3}\left\{\exp\left[\pm j2\pi\frac{f_l}{2}x\right]\cos[2\pi f_v z]Obj(x, z)\right\} * PSF_{WF}(x, z) \qquad (13)$$

$$P_{\pm 2}(x, z) \equiv \frac{1}{6}\{\exp[\pm j2\pi f_l x]Obj(x, z)\} * PSF_{WF}(x, z) \qquad (14)$$

The apparatus 100 picks up five modulated images by moving an illumination pattern, thereby generating five pieces of modulated image data. As formula (8) indicates, the five modulated image components included in the modulated image are combined according to different coefficients. Accordingly, the five pieces of generated modulated image data are used to solve simultaneous equations of five formulae (8) for i=0 to 4, with the result that five modulated image components are separately calculated.

In addition, for each of the calculated modulated image components, the origin of frequencies is, as depicted by the arrow in FIG. 6, shifted in the X direction so as to calculate the following demodulated image components obtained by demodulating modulated image components in the X direction.

$$(\tilde{P}'_0, \tilde{P}'_{+1}, \tilde{P}'_{-1}, \tilde{P}'_{+2}, \tilde{P}'_{-2})$$

Formulae (15)-(17) indicate five demodulated image components expressed using a spatial frequency. Formulae (18)-(20) indicate five demodulated image components expressed using spatial coordinates.

$$\tilde{P}'_0(f_x, f_z) \equiv \tilde{P}_0(f_x, f_z) = \tilde{O}bj(f_x, f_z) \cdot \tilde{PSF}_{WF}(f_x, f_z) \quad (15)$$

$$\tilde{P}'_{\pm 1}(f_x, f_z) \equiv \tilde{P}_{\pm 1}\left(f_x \pm \frac{f_l}{2}, f_z\right) = \quad (16)$$

$$\frac{1}{3}\{\tilde{O}bj(f_x, f_z - f_v) + \tilde{O}bj(f_x, f_z + f_v)\} \cdot \tilde{PSF}_{WF}\left(f_x \pm \frac{f_l}{2}, f_z\right) =$$

$$\frac{1}{3}\left[\delta(f_z - f_v) * \left\{\tilde{O}bj(f_x, f_z) \cdot \tilde{PSF}_{WF}\left(f_x \pm \frac{f_l}{2}, f_z + f_v\right)\right\} + \right.$$

$$\left. \delta(f_z + f_v) * \left\{\tilde{O}bj(f_x, f_z) \cdot \tilde{PSF}_{WF}\left(f_x \pm \frac{f_l}{2}, f_z - f_v\right)\right\}\right]$$

$$\tilde{P}'_{\pm 2}(f_x, f_z) \equiv \tilde{P}_{\pm 2}(f_x \pm f_l, f_z) = \frac{1}{6}\tilde{O}bj(f_x, f_z) \cdot \tilde{PSF}_{WF}(f_x \pm f_l, f_z) \quad (17)$$

$$P'_0(x, z) = Obj(x, z) * PSF_{WF}(x, z) \quad (18)$$

$$P'_{\pm 1}(x, z) = \frac{1}{3}\{\exp[j2\pi f_v z]Obj(x, z) + \exp[-j2\pi f_v z]Obj(x, z)\} * \quad (19)$$

$$\left\{\exp\left[\mp j2\pi\frac{f_l}{2}x\right]PSF_{WF}(x, z)\right\} =$$

$$\frac{1}{3}\exp[j2\pi f_v z]\left[Obj(x, z) * \left\{\exp\left[\mp j2\pi\frac{f_l}{2}x\right]\exp[-j2\pi f_v z]\right. \right.$$

$$\left. PSF_{WF}(x, z)\right\}\right] + \frac{1}{3}\exp[-j2\pi f_v z]\left[Obj(x, z) * \right.$$

$$\left.\left\{\exp\left[\mp j2\pi\frac{f_l}{2}x\right]\exp[j2\pi f_v z]PSF_{WF}(x, z)\right\}\right]$$

$$P'_{\pm 2}(x, z) = \frac{1}{6}Obj(x, z) * \{\exp[\mp j2\pi f_l x]PSF_{WF}(x, z)\} \quad (20)$$

A demodulated image is calculated by linearly combining the five demodulated image components, as indicated by formula (21). However, for the demodulated image, only a cross section of z=0 is imaged. $I_{3D\text{-}SIM}(x,z)$ indicates the intensity distribution of the demodulated image, and $w_0$, $w_1$, and $w_2$ indicate composite coefficients. In formula (21), a demodulated image is a real number, and hence the same composite coefficient $w_n$ is used to combine the following.

$$\tilde{P}'_{+n}, \tilde{P}'_{-n}$$

$$I_{3D\text{-}SIM}(x, z) = \quad (21)$$

$$w_0 Obj(x, z) * PSF_{WF}(x, z) + \frac{2}{3}w_1 \exp[j2\pi f_v z]\left[Obj(x, z) * \right.$$

$$\left.\left\{\cos\left[2\pi\frac{f_l}{2}x\right]\exp[-j2\pi f_v z]PSF_{WF}(x, z)\right\}\right] +$$

$$\frac{2}{3}w_1 \exp[-j2\pi f_v z]\left[Obj(x, z) * \right.$$

$$\left.\left\{\cos\left[2\pi\frac{f_l}{2}x\right]\exp[j2\pi f_v z]PSF_{WF}(x, z)\right\}\right] +$$

$$\frac{1}{3}w_2 Obj(x, z) * \{\cos[2\pi f_l x]PSF_{WF}(x, z)\}$$

Note that composite coefficients $w_0$, $w_1$, and $w_2$ are arbitrary values. However, it is preferable that point spread function $PSF_{3D\text{-}SIM}(x,z)$ of 3D-SIM indicated by formula (22) include no negative regions. Accordingly, in one possible example, $w_0 = w_1 = w_2 = 1$ is set.

$$PSF_{3D\text{-}SIM}(x, z) = \quad (22)$$

$$\left\{w_0 + \frac{4}{3}w_1 \cos\left[2\pi\frac{f_l}{2}x\right]\cos[2\pi f_v z] + \frac{1}{3}w_2 \cos[2\pi f_l x]\right\}PSF_{WF}(x, z)$$

$PSF_{3D\text{-}SIM}(x,z)$ will be additionally described in the following. Intensity distribution $I_{3D\text{-}SIM}(x, 0)$ of a demodulated image is expressed as formula (23) using $PSF_{3D\text{-}SIM}(x,z)$.

$$I_{3D\text{-}SIM}(x,0) = \{Obj(x,z) * PSF_{3D\text{-}SIM}(x,z)\}_{z=0} \quad (23)$$

As is clear from a comparison of formula (1) with formulae (22) and (23), in the case of $w_0 = w_1 = w_2 = 1$, point spread function $PSF_{3D\text{-}SIM}(x,z)$ of 3D-SIM is equal to the product of intensity distribution $Ill_{3D\text{-}SIM,i}(x,z)$ of three-dimensional-structure illumination under i=0 and the point spread function $PSF_{WF}(x,z)$ in a wide-field florescence observation. This is equal to the formula of a confocal image based on a confocal mask with a transmissivity distribution that is equal to the intensity distribution of three-dimensional-structure illumination under i=0. The term of $PSF_{3D\text{-}SIM}(x,z)$ that includes $w_0$ is exactly the shape of a PSF in a wide-field fluorescence observation. Accordingly, $PSF_{3D\text{-}SIM}(x,z)$ may essentially be a linear combination of a PSF in a wide-field fluorescence observation and a PSF in a confocal observation according to coefficients $w_0$, $w_1$, and $w_2$.

Figure 7:
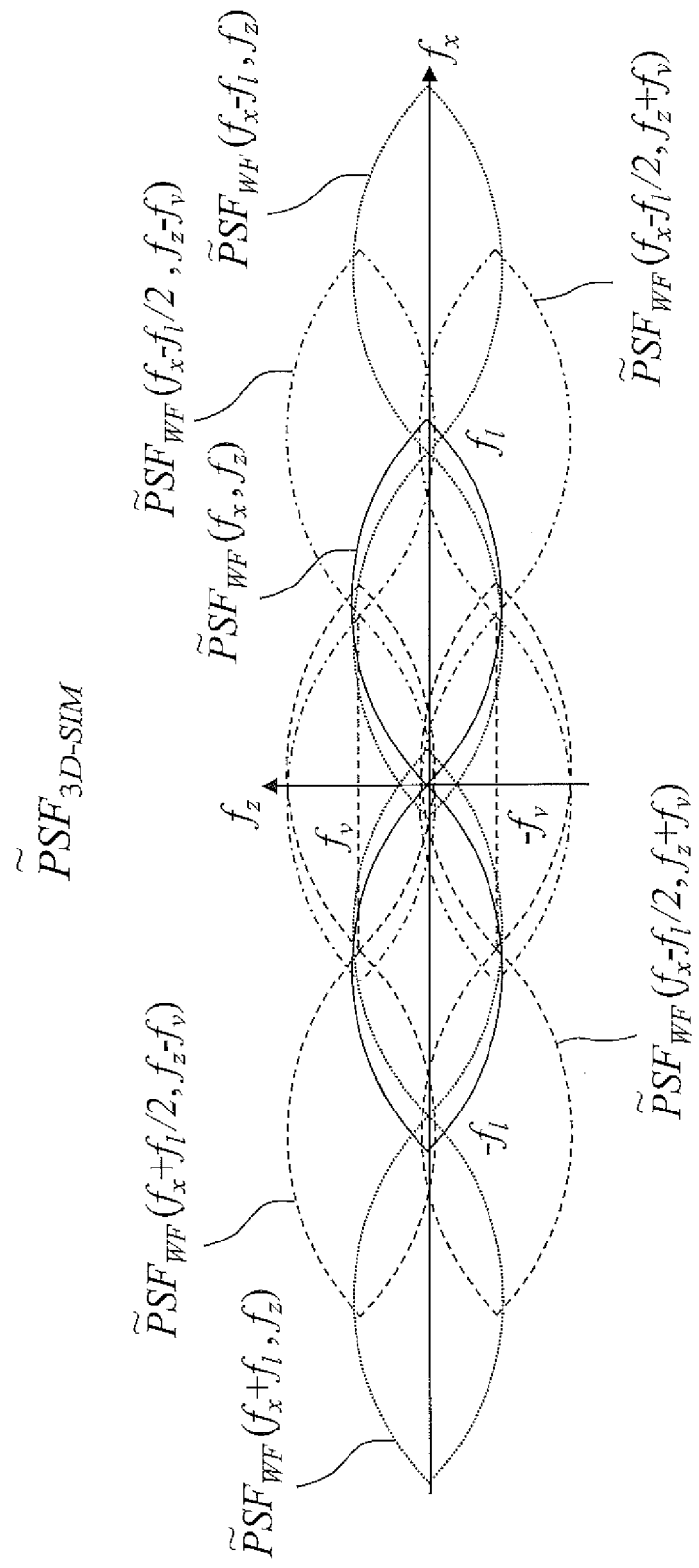
FIG. 7 illustrates a spatial frequency characteristic of a PSF according to 3D-SIM.
Figure 8:
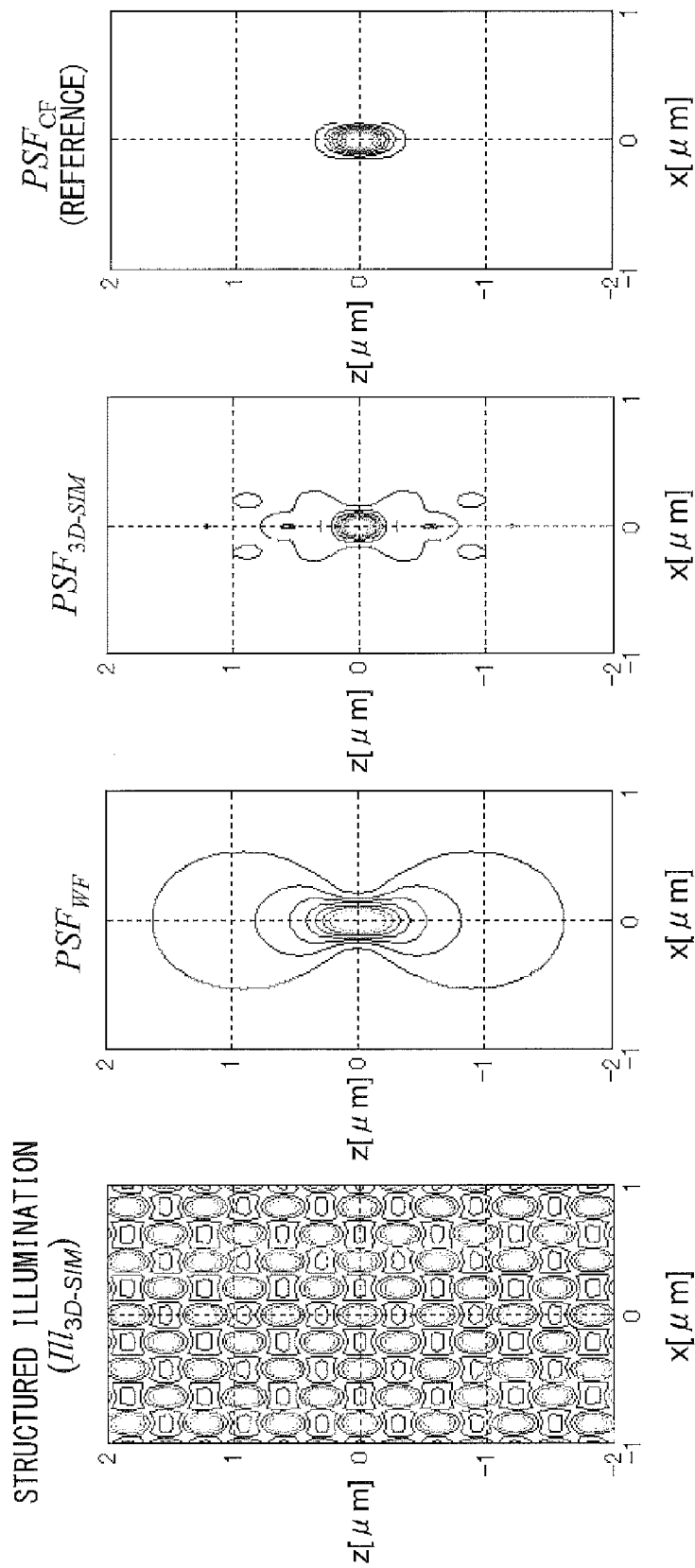

Formula (24) expresses a Fourier transform of $PSF_{3D\text{-}SIM}(x,z)$. That is, in a spatial frequency region, the PSF in 3D-SIM is, in both the X direction and the Z direction (optical axis direction), approximately twice as wide as the PSF in the wide-field fluorescence observation, as depicted in FIG. 7. This means that the demodulated image has a super resolution and a 3D resolution that is higher than those of images obtained in the wide-field fluorescence observation.

$$\tilde{PSF}_{3D\text{-}SIM}(f_x, f_z) = w_0 \tilde{PSF}_{WF}(f_x, f_z) + \quad (24)$$

$$\frac{1}{3}w_1\left\{\tilde{PSF}_{WF}\left(f_x - \frac{f_l}{2}, f_z - f_v\right) + \tilde{PSF}_{WF}\left(f_x - \frac{f_l}{2}, f_z + f_v\right) + \right.$$

$$\left. \tilde{PSF}_{WF}\left(f_x + \frac{f_l}{2}, f_z - f_v\right) + \tilde{PSF}_{WF}\left(f_x + \frac{f_l}{2}, f_z + f_v\right)\right\} +$$

$$\frac{1}{6}w_2\{\tilde{PSF}_{WF}(f_x - f_l, f_z) + \tilde{PSF}_{WF}(f_x + f_l, f_z)\}$$

FIGS. 8A-8D illustrate a simulation result of conventional 3D-SIM. FIG. 8A depicts an intensity distribution of three-dimensional-structure illumination. FIG. 8B depicts a PSF in a wide-field fluorescence observation. FIG. 8C depicts a PSF in 3D-SIM. FIG. 8D depicts, for reference, a PSF in a confocal observation based on a confocal mask on which a pinhole aperture is formed. In regard to the regions other than regions indicating relatively low values, FIGS. 8A-8D indicate that 3D-SIM shows resolutions in the X direction that are approximately equal to those in a confocal observation, and improved resolutions in the Z direction in comparison with those in the confocal observation. The simulation is based on the following conditions.

Numerical aperture of objective NA=1.38

Excitation wavelength $\lambda_{ex}$=488 nm, Fluorescence wavelength $\lambda_{em}$=520 nm Refractive index of immersion liquid (immersion oil) $n_0$=1.52, Refractive index of sample $n_1$=1.38

FIG. 9 illustrates a comparison between an I-z curve obtained through conventional 3D-SIM and an I-z curve obtained through a confocal observation. The I-z curves exhibit a defocus characteristic. A salient feature of 3D-SIM is that the PSF includes a PSF in a wide-field fluorescence observation at a weight of $w_0$. Accordingly, as depicted in FIG. 9, the defocus image disadvantageously contains a substantially high percentage of DC components (dashed dotted line). However, suppressing $w_0$ to decrease the percentage of DC components generates a strong negative luminance in a demodulated image before and after a focal position, and this is undesirable. In 3D-SIM, the DC components are called a baseline, and a process is performed for deducting the baseline from the demodulated image. In this case, the FWHM (full width at half maximum) of the I-z curve in 3D-SIM becomes seemingly narrower than the FWHM of the I-z curve in the confocal observation. However, such a comparison is not essential, and there is little difference in sectioning thickness in the z direction between 3D-SIM and the confocal observation.

The following will describe a problem of conventional 3D-SIM with reference to FIGS. 10-15.

Figure 10:
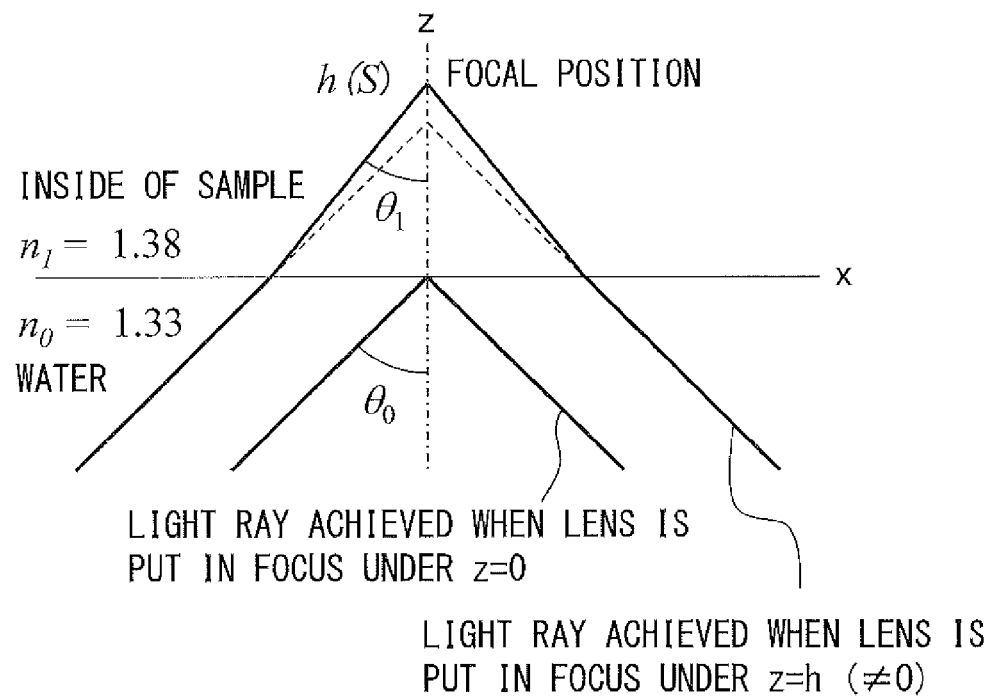
FIG. 10 illustrates an optical path length difference caused by an index mismatch specific to a water immersion objective.

FIG. 10 illustrates an optical path length difference caused by an index mismatch specific to a water immersion objective. However, for simplicity, a cover glass that would be present between a sample and water is not illustrated. As depicted in FIG. 10, the incident angle of a light ray relative to a focal position on the surface of a sample is different from the incident angle of alight ray relative to a focal position within the sample. Accordingly, a focal position located deeper within a sample results in a light ray having a larger optical path length difference with reference to the optical path length specific to a focal position on the surface of the sample. The optical path length difference, OPD, is expressed by formula (25). n0 and n1 respectively indicate the refractive indexes of an immersion liquid (water) and a sample. h(S=0) indicates the depth of a paraxial focal position with reference to the surface of a sample. Formula (26) defines S, where $\theta_0$ represents the incident angle of a light ray in the case of a focal position on the surface of the sample, and $\theta_1$ represents the incident angle of a light ray in the case of a focal position within the sample.

$$OPD = \left(\sqrt{n_1^2 - S^2} - \frac{n_0}{n_1}\sqrt{n_0^2 - S^2} - \frac{n_1^2 - n_0^2}{n_1}\right)h(S=0) \quad (25)$$

$$S \equiv n_0 \sin\theta_0 = n_1 \sin\theta_1 \quad (26)$$

Figure 11:
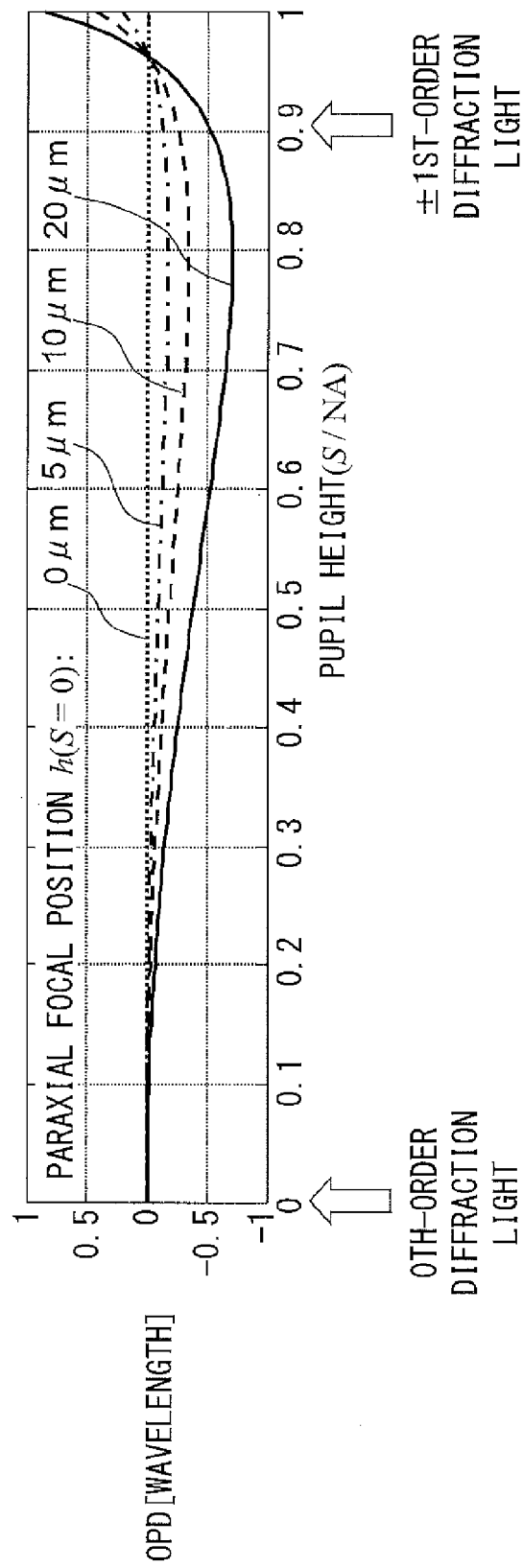
FIG. 11 illustrates a result of calculation of an optical path length difference caused by an index mismatch specific to a water immersion objective.

FIG. 11 illustrates a result of calculation of an optical path length difference caused by an index mismatch specific to a water immersion objective. The calculation result depicted in FIG. 11 is based on the assumption that wave aberration is not present when h(S=0)=0 (i.e., a situation in which a paraxial focal position is on the surface of the sample), and satisfies the following conditions.

Numerical aperture of objective NA=1.27, Excitation wavelength $\lambda_{ex}$=488 nm Refractive index of immersion liquid (water) $n_0$=1.33, Refractive index of sample $n_1$=1.38

As depicted in FIG. 11, when h(S=0)=0 μm, wave aberration is not present, and hence an optical path length difference is not generated irrespective of pupil height (S/NA). On the other hand, when a paraxial focal position is present within a sample (h(S=0)=5, 10, 20 μm), an optical path length difference is generated differently in accordance with the pupil height and the paraxial focal position. This means that, when the paraxial focal position is within the sample, an optical path length difference, and ultimately a phase difference, are generated between 0th-order diffraction light and ±1st-order diffraction light, and that the degree of the differences changes with the depth of the paraxial focal position. In FIG. 11, the optical path length difference between 0th-order diffraction light and ±1st-order diffraction light reaches about 0.5 wavelength when the depth of the paraxial focal position is 20 μm.

Figure 13:
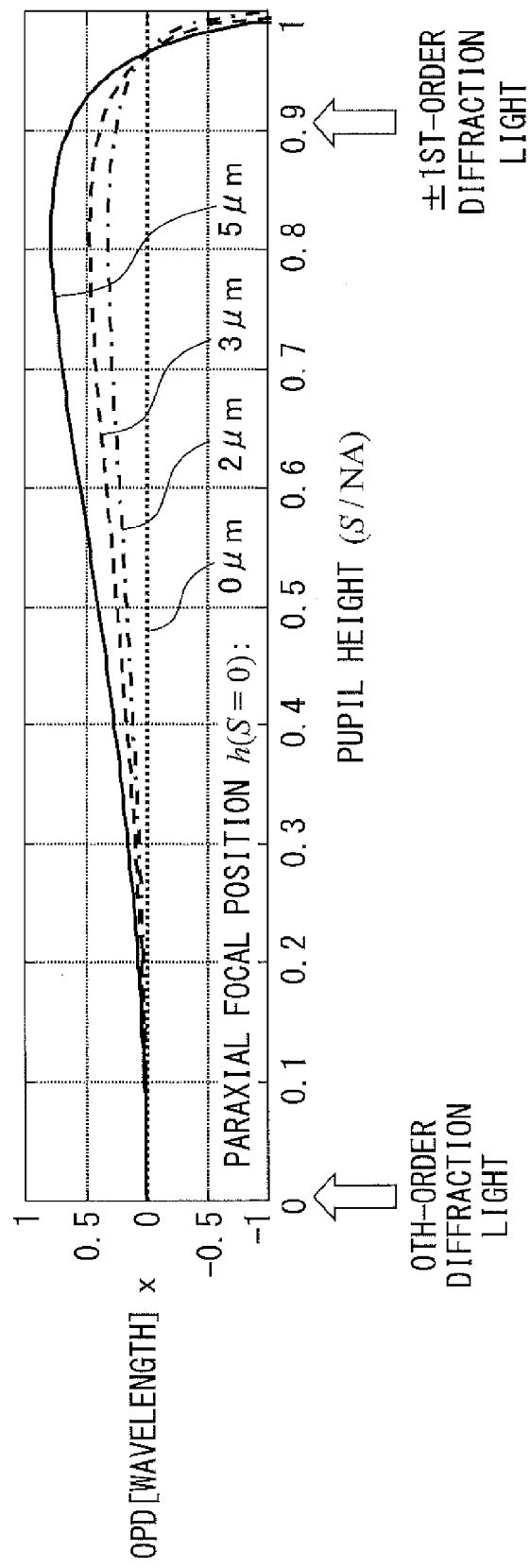
FIG. 13 illustrates a result of calculation of an optical path length difference caused by an index mismatch specific to an oil immersion objective.

Examples based on a water immersion objective have been described, but optical path length differences are similarly generated in an oil immersion objective. FIG. 12 illustrates an optical path length difference caused by an index mismatch specific to an oil immersion objective. FIG. 13 illustrates a result of calculation of an optical path length difference caused by an index mismatch specific to an oil immersion objective. The calculation result depicted in FIG. 13 is based on the assumption that wave aberration is not present when h(S=0)=0, and satisfies the conditions below. In FIG. 13, the optical path length difference between 0th-order diffraction light and ±1st-order diffraction light reaches about 0.5 wavelength when the depth of the paraxial focal position is 3 μm.

Numerical aperture of objective NA=1.38, Excitation wavelength $\lambda_{ex}$=488 nm Refractive index of immersion liquid (oil) $n_0$=1.52, Refractive index of sample $n_1$=1.38

Generation of an optical path length difference (phase difference) between 0th-order diffraction light and ±1st-order diffraction light causes structured illumination to be shifted in an optical axis direction (defocusing). For the three-dimensional-structure illumination in which defocusing has occurred, formula (27) expresses $PSF_{3D\text{-}SIM}(x,z)$, where $Z_f$ indicates a defocusing amount.

$$PSF_{3D\text{-}SIM}(x, z) = \left\{w_0 + \frac{4}{3}w_1\cos\left[2\pi\frac{f_l}{2}x\right]\cos[2\pi f_v(z + z_f)] + \frac{1}{3}w_2\cos[2\pi f_l x]\right\} PSF_{WF}(x, z) \quad (27)$$

FIGS. 14A-14E illustrate a simulation result of conventional 3D-SIM. FIGS. 14A-14E respectively indicate $PSF_{3D\text{-}SIM}(x,z)$ achieved when an optical path length difference between 0th-order diffraction light and ±1st-order diffraction light is 0 wavelength, ⅛ wavelength, ¼ wavelength, ⅜ wavelength, and ½ wavelength. FIGS. 14A-14E illustrate that, as the optical path length difference OPD increases simultaneously with the increase in the defocusing amount $Z_f$, the distribution of $PSF_3D$-SIM becomes wider, and images at positions outside the focal plane are more strongly conveyed. Such a simulation satisfies the following conditions.

Numerical aperture of objective NA=1.38

Excitation wavelength $\lambda_{ex}$=488 nm, Fluorescence wavelength $\lambda_{em}$=520 nm Refractive index of immersion liquid (immersion oil) $n_0$=1.52, Refractive index of sample $n_1$=1.38

Figure 15:
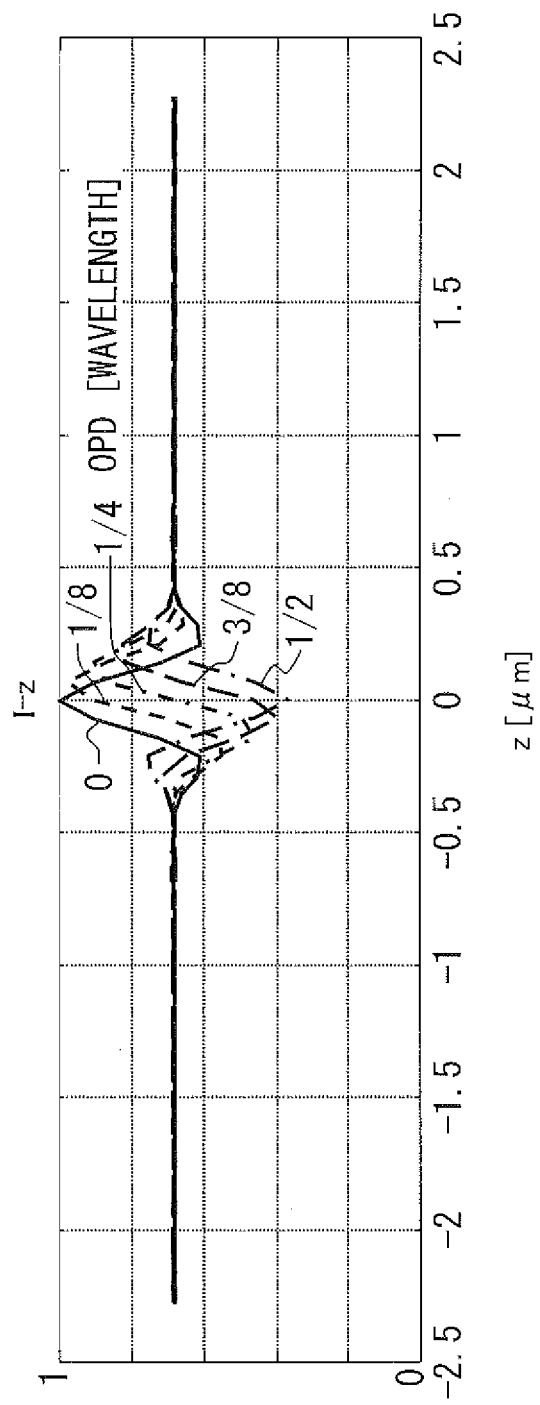
FIG. 15 illustrates an I-z curve obtained through 3D-SIM for each optical path length difference between 0th-order diffraction light and ±1st-order diffraction light.

FIG. 15 illustrates an I-z curve obtained through conventional 3D-SIM for each optical path length difference. FIG. 15 illustrates that, as an optical path length difference increases simultaneously with the increase in the defocusing amount $Z_f$, intensity peaks occur at positions outside the focal plane.

Figure 14:
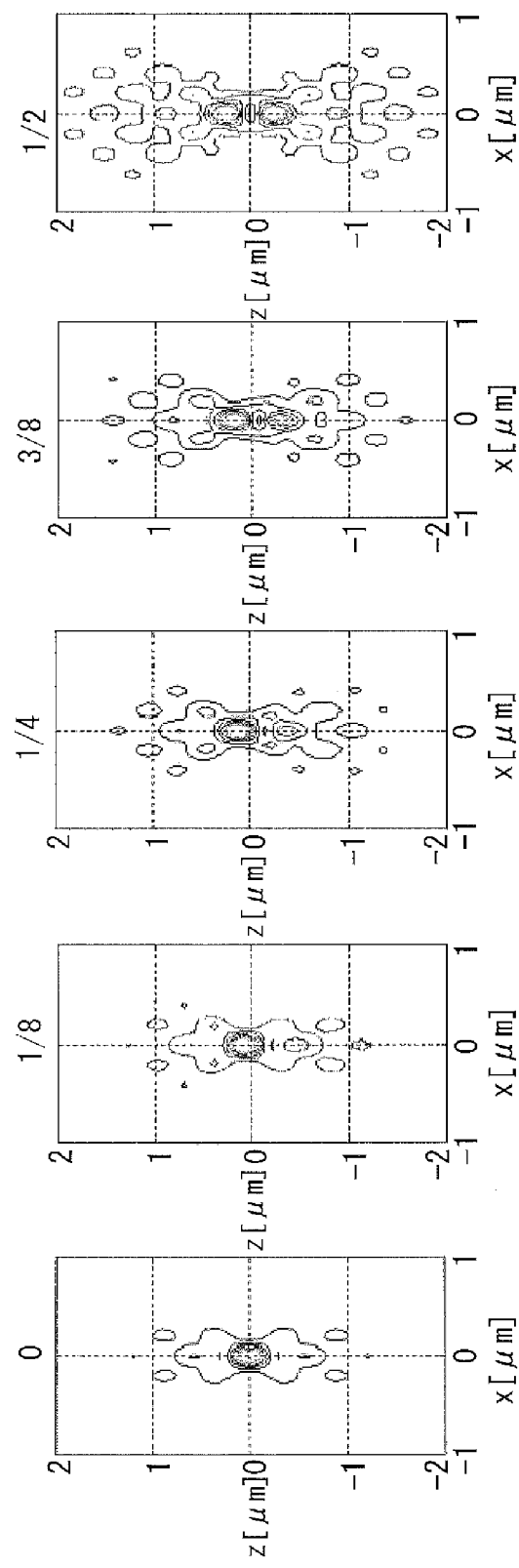
FIGS. 14A-14E illustrate a simulation result of a PSF according to 3D-SIM for each optical path length difference between 0th-order diffraction light and ±1st-order diffraction light, wherein FIGS. 14A-14E indicate $PSF_{3D\text{-}SIM}$ (x,z) achieved when an optical path length difference between 0th-order diffraction light and ±1st-order diffraction light is 0 wavelength, ⅛ wavelength, ¼ wavelength, ⅜ wavelength, and ½ wavelength, respectively.

Artifacts are likely to occur in a demodulated image in conventional 3D-SIM because a PSF is deteriorated as depicted in FIG. 14 when an optical path length difference is generated between 0th-order diffraction light and ±1st-order diffraction light. Deterioration of $PSF_{3D\text{-}SIM}$ is attributed to the facts that $PSF_{3D\text{-}SIM}$ is the product of the intensity distribution of structured illumination and $PSF_{WF}$ in the wide-field florescence observation and that, due to the optical path length difference, the origin position of the intensity distribution of the structured illumination is shifted in the Z direction from the focal plane. Accordingly, to suppress artifacts in conventional 3D-SIM, the focus position of 0th-order diffraction light and the focus position of ±1st-order diffraction light need to be made to accurately coincide with each other in advance in a manner such that the origin position of the intensity distribution of the structured illumination coincides with the focal plane.

However, as depicted in FIGS. 11 and 13, the optical path length difference changes remarkably with the depth of the paraxial focal position (the depth of the focal plane). Hence, irrespective of the depth of the focal plane, it is difficult to make the origin position of the intensity distribution of the structured illumination coincide with the focal plane. This is made to be more difficult because of an occurrence of a drift in the optical path difference caused by a temperature change. For such a reason, in conventional 3D-SIM, it is very difficult to suppress an occurrence of artifacts.

With reference to FIGS. 16-19, the following will describe new 3D-SIM for solving the problem described above. To clarify the difference from conventional 3D-SIM, the new 3D-SIM will hereinafter be referred to as R3D-SIM.

FIG. 16 illustrates the basic configuration of an apparatus 200 used in R3D-SIM. The apparatus 200 depicted in FIG. 16 moves a three-dimensional-structure illumination pattern in an X direction and a Z direction on a specified-distance by specified-distance basis so as to pick up a modulated image of a fluorescence sample (observed object) for each position after the movement. Demodulated image data having a super resolution is generated from a plurality of (in particular, seven) pieces of modulated image data obtained in such a way.

The apparatus 200 is different from the apparatus 100 in the sense that the diffraction grating 102 is movable in two directions, i.e., a direction in which 0th-order light travels (vertical direction) and a direction orthogonal to the vertical direction (lateral direction), and that, instead of the operational apparatus 111, an operational apparatus 211 is provided that generates demodulated image data from seven pieces of modulated image data.

The following will describe a method of generating a plurality of pieces of modulated image data by picking up a plurality of modulated images.

In the apparatus 200, moving the diffraction grating 102 in both the vertical direction and the lateral direction on a specified-amount by specified-amount basis causes the illumination pattern to move each time in the X direction and the Z direction 1/7 of a basic cycle (1/$f_l$) with reference to the X direction and 1/7 of a basic cycle (1/$f_v$) with reference to the Z direction, as illustrated in FIGS. 17A-17G. Note that circles in FIGS. 17A-17G indicate the positions of local maxima of illumination intensity within the illumination pattern and that black circles indicate reference positions within the illumination pattern. The apparatus 200 moves an illumination pattern in this way and picks up a sample image for each position after the movement, thereby generating seven pieces of modulated image data.

The following will describe a method of generating demodulated image data from a plurality of pieces of modulated image data. First, descriptions will be given of a situation in which structured illumination is not shifted in an optical axis direction (defocusing).

The intensity distribution $Ill_{R3D\text{-}SIM,i}(x,z)$ of three-dimensional-structure illumination is expressed by, for example, formula (28). As depicted in FIGS. 17A-17G, i is an integer from 0 to 6.

$$Ill_{R3D\text{-}SIM,i}(x,z) \equiv \qquad (28)$$

$$\left| \frac{2}{3} \exp\left[ j2\pi\left( f_{ex}z - \frac{2}{7}i \right) \right] + \frac{1}{2}\exp\left[ j2\pi\left\{ \left( \frac{f_l}{2}x + \frac{1}{7}i \right) + (f_{ex} - f_v)z \right\} \right] + \right.$$

$$\left. \frac{1}{2}\exp\left[ j2\pi\left\{ -\left( \frac{f_l}{2}x + \frac{1}{7}i \right) + (f_{ex} - f_v)z \right\} \right] \right|^2 =$$

$$1 + \frac{4}{3}\cos\left[ 2\pi\left( \frac{f_l}{2}x + \frac{1}{7}i \right) \right]\cos\left[ 2\pi\left( f_v z - \frac{2}{7}i \right) \right] + \frac{1}{3}\cos\left[ 2\pi\left( f_l x + \frac{2}{7}i \right) \right]$$

Formulae (29)-(33) are obtained by applying Fourier transform to formula (28).

$$\tilde{Ill}_{R3D\text{-}SIM,i}(f_x, f_z) = \tilde{M}_0(f_x, f_z) + \qquad (29)$$

$$\exp\left[ j2\pi\left( \frac{3}{7}i \right) \right]\tilde{M}_{+1-1}(f_x, f_z) + \exp\left[ -j2\pi\left( \frac{3}{7}i \right) \right]\tilde{M}_{-1+1}(f_x, f_z) +$$

$$\exp\left[ -j2\pi\left( \frac{1}{7}i \right) \right]\tilde{M}_{+1+1}(f_x, f_z) + \exp\left[ j2\pi\left( \frac{1}{7}i \right) \right]\tilde{M}_{-1-1}(f_x, f_z) +$$

$$\exp\left[ j2\pi\frac{2}{7}i \right]\tilde{M}_{+2}(f_x, f_z) + \exp\left[ -j2\pi\frac{2}{7}i \right]\tilde{M}_{-2}(f_x, f_z)$$

$$\tilde{M}_0(f_x, f_z) = \delta(f_x)\delta(f_z) \qquad (30)$$

$$\tilde{M}_{\pm 1+1}(f_x, f_z) = \frac{1}{3}\delta\left( f_x \mp \frac{f_l}{2} \right)\delta(f_z - f_v) \qquad (31)$$

$$\tilde{M}_{\pm 1-1}(f_x, f_z) = \frac{1}{3}\delta\left( f_x \mp \frac{f_l}{2} \right)\delta(f_z + f_v) \qquad (32)$$

$$\tilde{M}_{\pm 2}(f_x, f_z) = \frac{1}{6}\delta(f_x \mp f_l)\delta(f_z)M_{\pm 2}(f_x, f_z) = \frac{1}{6}\delta(f_x \mp f_l)\delta(f_z) \qquad (33)$$

Figure 18:
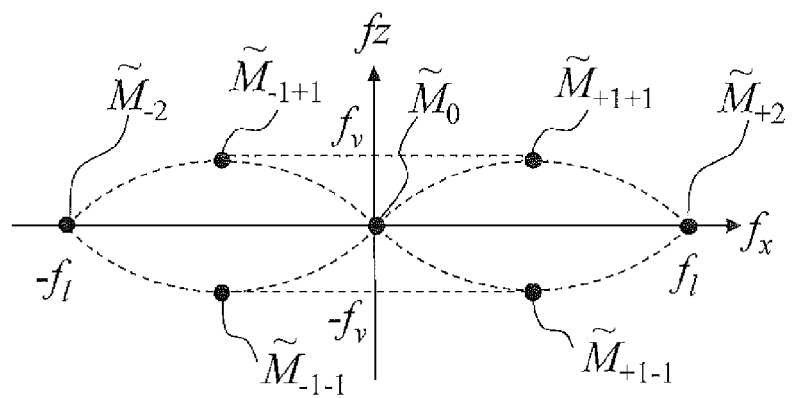
FIG. 18 illustrates Fourier transform of an intensity distribution of structured illumination according to R3D-SIM.

As formula (29) indicates, three-dimensional-structure illumination consists of a linear combination of the following seven modulated components also depicted in FIG. 18.

$$(\tilde{M}_0, \tilde{M}_{+1+1}, \tilde{M}_{+1-1}, \tilde{M}_{-1+1}, \tilde{M}_{-1-1}, \tilde{M}_{+2}, \tilde{M}_{-2})$$

An intensity distribution $I_{R3D\text{-}SIM,i}(x,z)$ of a modulated image projected onto the imaging element 110 is calculated as indicated by formula (34) by convolving the point spread function $PSF_{WF}(x,z)$ in a wide-field florescence observation to the product of the sample function $Obj(x,z)$ and an intensity distribution $\text{Ill}_{R3D\text{-}SIM,i}(x,z)$ of three-dimensional-structure illumination. Formula (35) is obtained by applying Fourier transform to formula (34).

$$I_{R3D\text{-}SIM,i}(x,z) = \{\text{Ill}_{R3D\text{-}SIM,i}(x,z) \cdot \text{Obj}(x,z)\} * \text{PSF}_{WF}(x,z) \tag{34}$$

$$\tilde{I}_{R3D\text{-}SIM,i}(f_x, f_z) = \{\tilde{\text{Ill}}_{R3D\text{-}SIM,i}(f_x, f_z) * \tilde{\text{Obj}}(f_x, f_z)\} \cdot \tilde{\text{PSF}}_{WF}(f_x, f_z) \tag{35}$$

In addition, expanding formula (35) using formulae (29)-(33) provides formulae (36)-(40).

$$\tilde{I}_{R3D\text{-}SIM,i}(f_x, f_z) = \tag{36}$$

$$\tilde{P}_0(f_x, f_z) + \exp\left[j2\pi\frac{3}{7}i\right]\tilde{P}_{+1+1}(f_x, f_z) + \exp\left[-j2\pi\frac{3}{7}i\right]\tilde{P}_{+1-1}(f_x, f_z) +$$

$$\exp\left[j2\pi\frac{1}{7}i\right]\tilde{P}_{-1+1}(f_x, f_z) + \exp\left[-j2\pi\frac{1}{7}i\right]\tilde{P}_{-1-1}(f_x, f_z) +$$

$$\exp\left[j2\pi\frac{2}{7}i\right]\tilde{P}_{+2}(f_x, f_z) + \exp\left[-j2\pi\frac{2}{7}i\right]\tilde{P}_{-2}(f_x, f_z)$$

$$\tilde{P}_0(f_x, f_z) \equiv \tilde{\text{Obj}}(f_x, f_z) \cdot \tilde{\text{PSF}}_{WF}(f_x, f_z) \tag{37}$$

$$\tilde{P}_{\pm 1+1}(f_x, f_z) \equiv \frac{1}{3}\tilde{\text{Obj}}\left(f_x \mp \frac{f_l}{2}, f_z - f_v\right) \cdot \tilde{\text{PSF}}_{WF}(f_x, f_z) \tag{38}$$

$$\tilde{P}_{\pm 1-1}(f_x, f_z) \equiv \frac{1}{3}\tilde{\text{Obj}}\left(f_x \mp \frac{f_l}{2}, f_z + f_v\right) \cdot \tilde{\text{PSF}}_{WF}(f_x, f_z) \tag{39}$$

$$\tilde{P}_{\pm 2}(f_x, f_z) \equiv \frac{1}{6}\tilde{\text{Obj}}(f_x \mp f_l, f_z) \cdot \tilde{\text{PSF}}_{WF}(f_x, f_z) \tag{40}$$

Figure 19:
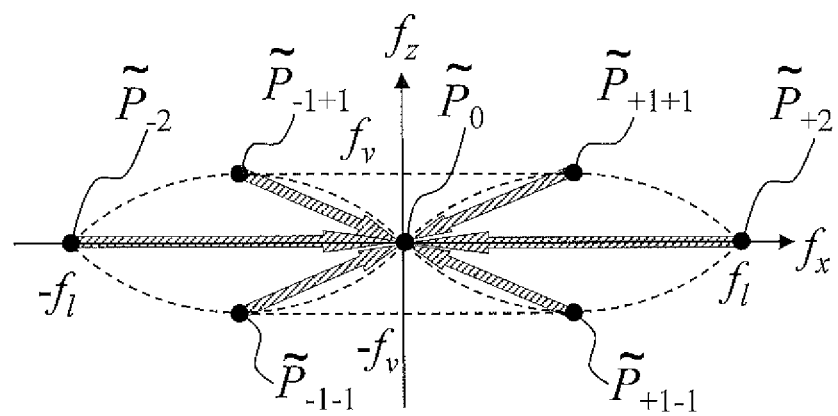
FIG. 19 illustrates demodulation of a modulated image component according to R3D-SIM.

As formula (36) indicates, a modulated image consists of a linear combination of the following seven modulated image components also depicted in FIG. 19.

$$(\tilde{P}_0, \tilde{P}_{+1+1}, \tilde{P}_{+1-1}, \tilde{P}_{-1+1}, \tilde{P}_{-1-1}, \tilde{P}_{+2}, \tilde{P}_{-2})$$

Each individual modulated image component is an image component with the origin of frequencies shifted due to the influence of a corresponding modulated component.

Formulae (37)-(40) indicate seven modulated image components expressed using a spatial frequency. Formulae (41)-(44) indicate seven modulated image components expressed using spatial coordinates.

$$P_0(x, z) \equiv \text{Obj}(x, z) * \text{PSF}_{WF}(x, z) \tag{41}$$

$$P_{\pm 1+1}(x, z) \equiv \frac{2}{3}\left\{\exp\left[\pm j2\pi\frac{f_l}{2}x\right]\exp[2\pi f_v z]\text{Obj}(x, z)\right\} * \text{PSF}_{WF}(x, z) \tag{42}$$

$$P_{\pm 1}(x, z) \equiv \frac{2}{3}\left\{\exp\left[\pm j2\pi\frac{f_l}{2}x\right]\exp[-2\pi f_v z]\text{Obj}(x, z)\right\} * \text{PSF}_{WF}(x, z) \tag{43}$$

$$P_{\pm 2}(x, z) \equiv \frac{1}{6}\{\exp[\pm j2\pi f_l x]\text{Obj}(x, z)\} * \text{PSF}_{WF}(x, z) \tag{44}$$

The apparatus 200 picks up seven modulated images by moving an illumination pattern, thereby generating seven pieces of modulated image data. As formula (36) indicates, the seven modulated image components included in the modulated image are combined according to different coefficients. Accordingly, the seven pieces of generated modulated image data are used to solve simultaneous equations of seven formulae (36) for i=0 to 6, with the result that the seven modulated image components are separately calculated.

In addition, for each of the calculated modulated image components, the origin of frequencies is, as depicted by the arrow in FIG. 19, shifted so as to calculate the following demodulated image components.

$$(\tilde{P}'_0, \tilde{P}'_{+1+1}, \tilde{P}'_{+1-1}, \tilde{P}'_{-1+1}, \tilde{P}'_{-1-1}, \tilde{P}'_{+2}, \tilde{P}'_{-2})$$

In this example, unlike in conventional 3D-SIM, modulated image components shifted in the Z direction in addition to the X direction are demodulated not only in the X direction but also in the Z direction. That is, demodulated image components are image components obtained by demodulating the modulated image components in the X direction and the Z direction. Formulae (45)-(48) indicate seven demodulated image components expressed using a spatial frequency. Formulae (49)-(52) indicate seven demodulated image components expressed using spatial coordinates.

$$\tilde{P}'_0(f_x, f_z) \equiv \tilde{P}_0(f_x, f_z) = \tilde{\text{Obj}}(f_x, f_z) \cdot \tilde{\text{PSF}}_{WF}(f_x, f_z) \tag{45}$$

$$\tilde{P}'_{\pm 1+1}(f_x, f_z) \equiv \tilde{P}_{\pm 1}\left(f_x \pm \frac{f_l}{2}, f_z + f_v\right) = \tag{46}$$

$$\frac{1}{3}\tilde{\text{Obj}}(f_x, f_z + f_v) \cdot \tilde{\text{PSF}}_{WF}\left(f_x \pm \frac{f_l}{2}, f_z\right) =$$

$$\frac{1}{3}\delta(f_z + f_v) * \left\{\tilde{\text{Obj}}(f_x, f_z) \cdot \tilde{\text{PSF}}_{WF}\left(f_x \pm \frac{f_l}{2}, f_z - f_v\right)\right\}$$

$$\tilde{P}'_{\pm 1-1}(f_x, f_z) \equiv \tilde{P}_{\pm 1}\left(f_x \pm \frac{f_l}{2}, f_z + f_v\right) = \tag{47}$$

$$\frac{1}{3}\tilde{\text{Obj}}(f_x, f_z - f_v) \cdot \tilde{\text{PSF}}_{WF}\left(f_x \pm \frac{f_l}{2}, f_z\right) =$$

$$\frac{1}{3}\delta(f_z + f_v) * \left\{\tilde{\text{Obj}}(f_x, f_z) \cdot \tilde{\text{PSF}}_{WF}\left(f_x \pm \frac{f_l}{2}, f_z - f_v\right)\right\}$$

$$\tilde{P}'_{\pm 2}(f_x, f_z) \equiv \tilde{P}_{\pm 2}(f_x \pm f_{lx}, f_z) = \frac{1}{6}\tilde{\text{Obj}}(f_x, f_z) \cdot \tilde{\text{PSF}}_{WF}(f_x \pm f_l, f_z) \tag{48}$$

$$P'_0(x, z) = \text{Obj}(x, z) * \text{PSF}_{WF}(x, z) \tag{49}$$

$$P'_{\pm 1+1}(x, z) = \frac{1}{3}\text{Obj}(x, z) * \left\{\exp\left[\mp j2\pi\frac{f_l}{2}x\right]\exp[-j2\pi f_v z]\text{PSF}_{WF}(x, z)\right\} \tag{50}$$

$$P'_{\pm 1-1}(x, z) = \frac{1}{3}\text{Obj}(x, z) * \left\{\exp\left[\mp j2\pi\frac{f_l}{2}x\right]\exp[j2\pi f_v z]\text{PSF}_{WF}(x, z)\right\} \tag{51}$$

$$P'_{\pm 2}(x, z) = \frac{1}{6}\text{Obj}(x, z) * \{\exp[\mp j2\pi f_l x]\text{PSF}_{WF}(x, z)\} \tag{52}$$

A demodulated image is calculated by linearly combining the seven demodulated image components, as indicated by formula (53). However, for the demodulated image, only a cross section of z=0 is imaged. $I_{R3D\text{-}SIM}(x,z)$ indicates the intensity distribution of the demodulated image, and $w_0$, $w_1$, and $w_2$ indicate composite coefficients. In formula (53), a demodulated image is a real number, and hence the same composite coefficient $w_1$ is used to combine the following.

$$P'_{+1+1}, P'_{+1-1}, P'_{-1+1}, P'_{-1-1}$$

The same composite coefficient $w_2$ is used to combine the following.

$$P'_{+2}, P'_{-2}$$

$$I_{R3D\text{-}SIM}(x, z) = w_0 P'_0(x, z) + \tag{53}$$

$$w_1\{P'_{+1+1}(x, z) + P'_{+1-1}(x, z) + P'_{-1+1}(x, z)P'_{-1-1}(x, z)\} +$$

$$w_2\{P'_{+2}(x, z) + P'_{-2}(x, z)\} \equiv \text{Obj}(x, z) * \text{PSF}_{R3D\text{-}SIM}(x, z)$$

Note that composite coefficients $w_0$, $w_1$, and $w_2$ are arbitrary values. However, it is preferable that a point spread function $PSF_{R3D\text{-}SIM}(x,z)$ of R3D-SIM indicated by formula (54) include no negative regions. Accordingly, in one possible example, $w_0=w_1=w_2=1$ is set. As formulae (54) and (55) indicate, the PSF of R3D-SIM is identical with the PSF of 3D-SIM.

$$PSF_{R3D\text{-}SIM}(x, z) \equiv PSF_{3D\text{-}SIM}(x, z) = \tag{54}$$
$$\left\{w_0 + \frac{4}{3}w_1\cos\left[2\pi\frac{f_l}{2}x\right]\cos[2\pi f_v z] + \frac{1}{3}w_2\cos[2\pi f_l x]\right\}PSF_{WF}(x,z)$$

$$\tilde{PSF}_{R3D\text{-}SIM}(f_x, f_z) \equiv \tilde{PSF}_{3D\text{-}SIM}(f_x, f_z) = w_0\tilde{PSF}_{WF}(f_x, f_z) + \tag{55}$$
$$\frac{1}{3}w_1\left\{\tilde{PSF}_{WF}\left(f_x - \frac{f_l}{2}, f_z - f_v\right) + \tilde{PSF}_{WF}\left(f_x - \frac{f_l}{2}, f_z + f_v\right) + \right.$$
$$\left.\tilde{PSF}_{WF}\left(f_x + \frac{f_l}{2}, f_z - f_v\right) + \tilde{PSF}_{WF}\left(f_x + \frac{f_l}{2}, f_z + f_v\right)\right\} +$$
$$\frac{1}{6}w_2\{\tilde{PSF}_{WF}(f_x - f_l, f_z) + \tilde{PSF}_{WF}(f_x + f_l, f_z)\}$$

The following will describe a situation in which structured illumination has been shifted in an optical axis direction by a defocusing amount $z_f$ (defocusing).

The intensity distribution $Ill_{R3D\text{-}SIM,i}(x, z-z_f)$ of three-dimensional-structure illumination that has been shifted in the optical axis direction by $z_f$ is expressed by, for example, formula (56).

$$Ill_{R3D\text{-}SIM,i}(x, z - z_f) = \tag{56}$$
$$1 + \frac{4}{3}\cos\left[2\pi\left(\frac{f_l}{2}x + \frac{1}{7}i\right)\right]\cos\left[2\pi\left(f_v(z - z_f) - \frac{2}{7}i\right)\right] +$$
$$\frac{1}{3}\cos\left[2\pi\left(f_l x + \frac{2}{7}i\right)\right]$$

Accordingly, in the sense that the seven modulated components $$(\tilde{M}_0, \tilde{M}_{+1+1}, \tilde{M}_{+1-1}, \tilde{M}_{-1+1}, \tilde{M}_{-1-1}, \tilde{M}_{+2}, \tilde{M}_{-2})$$

are linearly combined, as formula (57) indicates, $$\tilde{Ill}_{R3D\text{-}SIM,i}(f_x, f_z)$$

is identical with that in a situation in which defocusing has not occurred (see formula (29)).

However, as formulae (58)-(61) indicate, the modulated components is different from that in a situation in which defocusing has not occurred.

$$\tilde{Ill}_{R3D\text{-}SIM,i}(f_x, f_z) = \tilde{M}_0(f_x, f_z) + \tag{57}$$
$$\exp\left[j2\pi\frac{3}{7}i\right]\tilde{M}_{+1-1}(f_x, f_z) + \exp\left[-j2\pi\frac{3}{7}i\right]\tilde{M}_{-1+1}(f_x, f_z) +$$
$$\exp\left[-j2\pi\frac{1}{7}i\right]\tilde{M}_{+1+1}(f_x, f_z) + \exp\left[j2\pi\frac{1}{7}i\right]\tilde{M}_{-1-1}(f_x, f_z) +$$
$$\exp\left[j2\pi\frac{2}{7}i\right]\tilde{M}_{+2}(f_x, f_z) + \exp\left[-j2\pi\frac{2}{7}i\right]\tilde{M}_{-2}(f_x, f_z)$$

$$\tilde{M}_0(f_x, f_z) = \delta(f_x)\delta(f_z) \tag{58}$$

$$\tilde{M}_{\pm 1+1}(f_x, f_z) = \frac{1}{3}\exp[j2\pi f_v z_f]\delta\left(f_x \mp \frac{f_l}{2}\right)\delta(f_z - f_v) \tag{59}$$

$$\tilde{M}_{\pm 1-1}(f_x, f_z) = \frac{1}{3}\exp[-j2\pi f_v z_f]\delta\left(f_x \mp \frac{f_l}{2}\right)\delta(f_z + f_v) \tag{60}$$

$$\tilde{M}_{\pm 2}(f_x, f_z) = \frac{1}{6}\delta(f_x \mp f_l)\delta(f_z) \tag{61}$$

A modulated image specific to a situation in which structured illumination is defocused is determined according to formulae (62) and (63).

$$I_{R3D\text{-}SIM,i}(x,z)=\{Ill_{R3D\text{-}SIM,i}(x,z-z_f) \cdot Obj(x,z)\}*PSF_{WF}(x,z) \tag{62}$$

$$\tilde{I}_{R3D\text{-}SIM,i}(f_x,f_z)=\{\exp[j2\pi f_v z_f]\tilde{Ill}_{R3D\text{-}SIM,i}(f_x,f_z)* \tilde{Obj}(f_x,f_z)\} \cdot \tilde{PSF}_{WF}(f_x,f_z) \tag{63}$$

Expanding formula (63) using formulae (57)-(61) provides formulae (64)-(68).

$$\tilde{I}_{R3D\text{-}SIM,i}(f_x, f_z) = \tag{64}$$
$$\tilde{P}_0(f_x, f_z) + \exp\left[j2\pi\frac{3}{7}i\right]\tilde{P}_{+1+1}(f_x, f_z) + \exp\left[-j2\pi\frac{3}{7}i\right]\tilde{P}_{+1-1}(f_x, f_z) +$$
$$\exp\left[j2\pi\frac{1}{7}i\right]\tilde{P}_{-1+1}(f_x, f_z) + \exp\left[-j2\pi\frac{1}{7}i\right]\tilde{P}_{-1-1}(f_x, f_z) +$$
$$\exp\left[j2\pi\frac{2}{7}i\right]\tilde{P}_{+2}(f_x, f_z) + \exp\left[-j2\pi\frac{2}{7}i\right]\tilde{P}_{-2}(f_x, f_z)$$

$$\tilde{P}_0(f_x, f_z) \equiv \tilde{Obj}(f_x, f_z) \cdot \tilde{PSF}_{WF}(f_x, f_z) \tag{65}$$

$$\tilde{P}_{\pm 1+1}(f_x, f_z) \equiv \frac{1}{3}\exp[j2\pi f_v z_f]\tilde{Obj}\left(f_x \mp \frac{f_l}{2}, f_z - f_v\right) \cdot \tilde{PSF}_{WF}(f_x, f_z) \tag{66}$$

$$\tilde{P}_{\pm 1-1}(f_x, f_z) \equiv \frac{1}{3}\exp[-j2\pi f_v z_f]\tilde{Obj}\left(f_x \mp \frac{f_l}{2}, f_z - f_v\right) \cdot \tilde{PSF}_{WF}(f_x, f_z) \tag{67}$$

$$\tilde{P}_{\pm 2}(f_x, f_z) \equiv \frac{1}{6}\tilde{Obj}(f_x \mp f_l, f_z) \cdot \tilde{PSF}_{WF}(f_x, f_z) \tag{68}$$

Formulae (69)-(72) indicate modulated image components expressed using spatial coordinates under a condition in which structured illumination is defocused.

$$P_0(x, z) \equiv Obj(x, z) * PSF_{WF}(x, z) \tag{69}$$

$$P_{\pm 1+1}(x, z) \equiv \tag{70}$$
$$\frac{2}{3}\exp[j2\pi f_v z_f]\left\{\exp\left[\pm j2\pi\frac{f_l}{2}x\right]\exp[2\pi f_v z]Obj(x, z)\right\} * PSF_{WF}(x, z)$$

$$P_{\pm 1-1}(x, z) \equiv \tag{71}$$
$$\frac{2}{3}\exp[-j2\pi f_v z_f]\left\{\exp\left[\pm j2\pi\frac{f_l}{2}x\right]\exp[-2\pi f_v z]Obj(x, z)\right\} *$$
$$PSF_{WF}(x, z)$$

$$P_{\pm 2}(x, z) \equiv \frac{1}{6}\{\exp[\pm j2\pi f_l x]Obj(x, z)\} * PSF_{WF}(x, z) \tag{72}$$

Comparing formulae (69)-(72) with formulae (41)-(54) clarifies that defocusing of structured illumination affects the following modulated image components.

$$P_{\pm 1+1}(x,z), P_{\pm 1-1}(x,z)$$

Accordingly, in the demodulating of a modulated image component, the modulated image component is corrected by multiplying a correction coefficient corresponding to a defocusing amount by the modulated image component. Formulae (73)-(76) indicate demodulated image components expressed using a spatial frequency. Comparing formulae (73)-(76) with formulae (45) and (48) clarifies that, in formulae (74) and (75), demodulated image components are calculated by multiplying a correction coefficient. That is, the correction coefficient (depending on the defocusing amount $z_f$) is used to demodulate modulated image components to which frequency shifting has been occurred in the optical axis direction.

$$\tilde{P}'_o(f_x, f_z) \equiv \tilde{P}_0(f_x, f_z) = \tilde{Obj}(f_x, f_z) \cdot \tilde{PSF}_{WF}(f_x, f_z) \quad (73)$$

$$\tilde{P}'_{\pm 1+1}(f_x, f_z) \equiv \exp[-j2\pi f_v z_f]\tilde{P}_{\pm 1}\left(f_x \pm \frac{f_l}{2}, f_z + f_v\right) = \quad (74)$$

$$\frac{1}{3}\tilde{Obj}(f_x, f_z + f_v) \cdot \tilde{PSF}_{WF}\left(f_x \pm \frac{f_l}{2}, f_z\right) =$$

$$\frac{1}{3}\delta(f_z + f_v) * \left\{\tilde{Obj}(f_x, f_z) \cdot \tilde{PSF}_{WF}\left(f_x \pm \frac{f_l}{2}, f_z - f_v\right)\right\}$$

$$\tilde{P}'_{\pm 1-1}(f_x, f_z) \equiv \exp[j2\pi f_v z_f]\tilde{P}_{\pm 1}\left(f_x \pm \frac{f_l}{2}, f_z - f_v\right) = \quad (75)$$

$$\frac{1}{3}\tilde{Obj}(f_x, f_z - f_v) \cdot \tilde{PSF}_{WF}\left(f_x \pm \frac{f_l}{2}, f_z\right) =$$

$$\frac{1}{3}\delta(f_z + f_v) * \left\{\tilde{Obj}(f_x, f_z) \cdot \tilde{PSF}_{WF}\left(f_x \pm \frac{f_l}{2}, f_z - f_v\right)\right\}$$

$$\tilde{P}'_{\pm 2}(f_x, f_z) \equiv \tilde{P}_{\pm 2}(f_x \pm f_l, f_z) = \frac{1}{6}\tilde{Obj}(f_x, f_z) \cdot \tilde{PSF}_{WF}(f_x \pm f_l, f_z) \quad (76)$$

Accordingly, as formulae (77)-(80) indicate, demodulated image components are the same as those in a situation in which the structured illumination indicated by formulae (49)-(52) is not defocused.

$$P'_0(x, z) = Obj(x, z) * PSF_{WF}(x, z) \quad (77)$$

$$P'_{\pm 1+1}(x, z) = \frac{1}{3}Obj(x, z) * \left\{\exp\left[\mp j2\pi \frac{f_l}{2}x\right]\exp[-j2\pi f_v z]PSF_{WF}(x, z)\right\} \quad (78)$$

$$P'_{\pm 1-1}(x, z) = \frac{1}{3}Obj(x, z) * \left\{\exp\left[\mp j2\pi \frac{f_l}{2}x\right]\exp[j2\pi f_v z]PSF_{WF}(x, z)\right\} \quad (79)$$

$$P'_{\pm 2}(x, z) = \frac{1}{6}Obj(x, z) * \{\exp[\mp j2\pi f_l x]PSF_{WF}(x, z)\} \quad (80)$$

Accordingly, as formula (53) indicates, a demodulated image that is the same as a demodulated image specific to a situation in which defocusing has not occurred is calculated by linearly combining seven demodulated image components.

The defocusing amount $z_f$ may be calculated through theoretical calculation for each depth of a paraxial focal position, or may be actually measured in advance. In addition, the defocusing amount $z_f$ may be determined by repeatedly making an adjustment while checking a demodulated image on a monitor.

Even when structured illumination is defocused, R3D-SIM enables generation of sample image (demodulated image) data with the influence of defocusing eliminated, unlike conventional 3D-SIM. Accordingly, sample image data having a super resolution may be generated through 3D-SIM while suppressing generation of artifacts. Structured illumination does not need to be accurately put in focus on a focal plane. Thus, precise focus adjustments of structured illumination may be omitted.

The following will describe embodiments of the invention.

Embodiment 1

Figure 20:
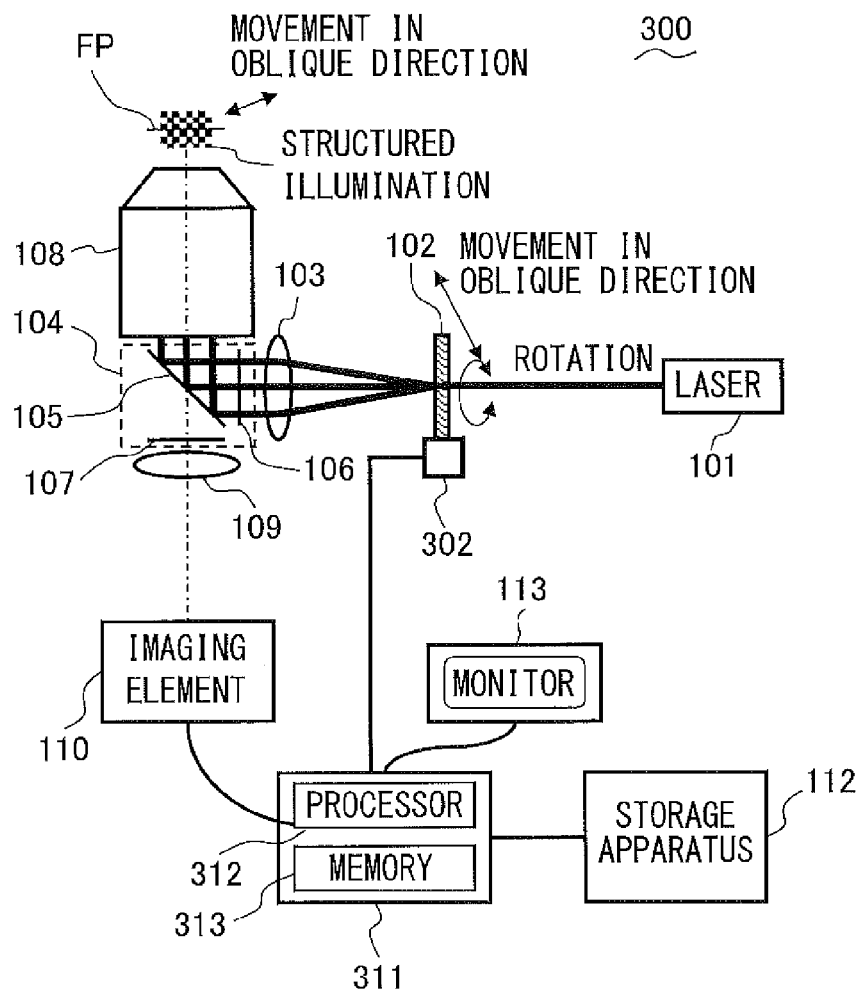
FIG. 20 illustrates the basic configuration of an apparatus in accordance with embodiment 1.

FIG. 20 illustrates the configuration of an apparatus 300 used in R3D-SIM in accordance with the present embodiment. The apparatus 300 is a sample image data generating apparatus that generates, through the R3D-SIM described above, sample image data having a super resolution three-dimensionally.

The apparatus 300 is different from the apparatus 200 depicted in FIG. 16 in the sense that the apparatus 300 includes a driving apparatus 302 that moves the diffraction grating 102, and that the apparatus 300 includes an operational apparatus 311 that includes a processor 312 and a memory 313, instead of the operational apparatus 211. The other components of the apparatus 300 are similar to those of the apparatus 200 and are given like reference marks, and descriptions thereof are omitted herein.

The driving apparatus 302 functions as an illumination pattern shifter that moves an illumination pattern in an X direction and a Z direction with respect to a sample, and is configured to move the diffraction grating 102 in an oblique direction on a specified-amount by specified-amount basis. As a result, with respect to the sample, a three-dimensional-structure illumination pattern formed on a focal plane FP moves each time in the X direction and the Z direction 1/7 of a basic cycle (1/$f_l$) with reference to the X direction and 1/7 of a basic cycle (1/$f_v$) with reference to the Z direction.

For each position after the movement, the imaging element 110 picks up a modulated image projected onto the imaging element 110. That is, in the apparatus 300, the imaging element 110 functions as a modulated image imager that picks up a modulated image that is a sample image modulated by structured illumination forming an illumination pattern having a periodic structure in the Z direction and the X direction. The operational apparatus 311 generates a plurality of pieces of modulated image data according to an output signal from the imaging element 110.

In the apparatus 300, the diffraction grating 102 functions as a light beam generator that generates three light beams to be incident on the objective 108 from laser light emitted from the laser 101 (coherent light). The diffraction grating 102, an optical system that projects the diffraction grating 102 onto a sample (e.g., an objective and the illumination lens 103), and the laser 101 function as a pattern generator that forms an illumination pattern on the sample according to interference between the three light beams incident on the objective 108.

In addition, the driving apparatus 302 is configured to rotate the diffraction grating 102 sixty degrees three times. This changes the azimuth of the illumination pattern (the azimuth of interference fringes) at a plane orthogonal to an optical axis by sixty degrees each time.

For each azimuth after rotation, the imaging element 110 picks up a demodulated image projected onto the imaging element 110. The operational apparatus 311 generates a plurality of pieces of modulated image data.

As a result of the movement and rotation of the diffraction grating 102, a total of 21 pieces of modulated image data are generated. The processor 312 executes a control program loaded into the memory 313 so as to cause the operational apparatus 311 to generate one piece of demodulated image data from the 21 pieces of modulated image data through the R3D-SIM described above. The demodulated image data has a super resolution three-dimensionally and is essentially isotropic two-dimensionally.

In addition, in accordance with an instruction from the user, the operational apparatus 311 stores the demodulated image data in a storage apparatus 112 and displays the demodulated image of the sample on a monitor 113, i.e., a display, according to the demodulated image data.

Figure 21:
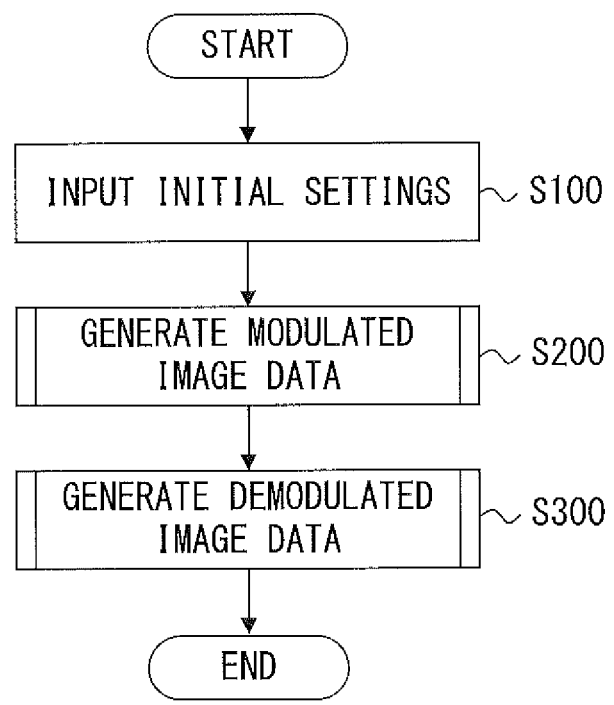
FIG. 21 is a flowchart of the entirety of processing performed by an apparatus in accordance with embodiment 1.
Figure 22:
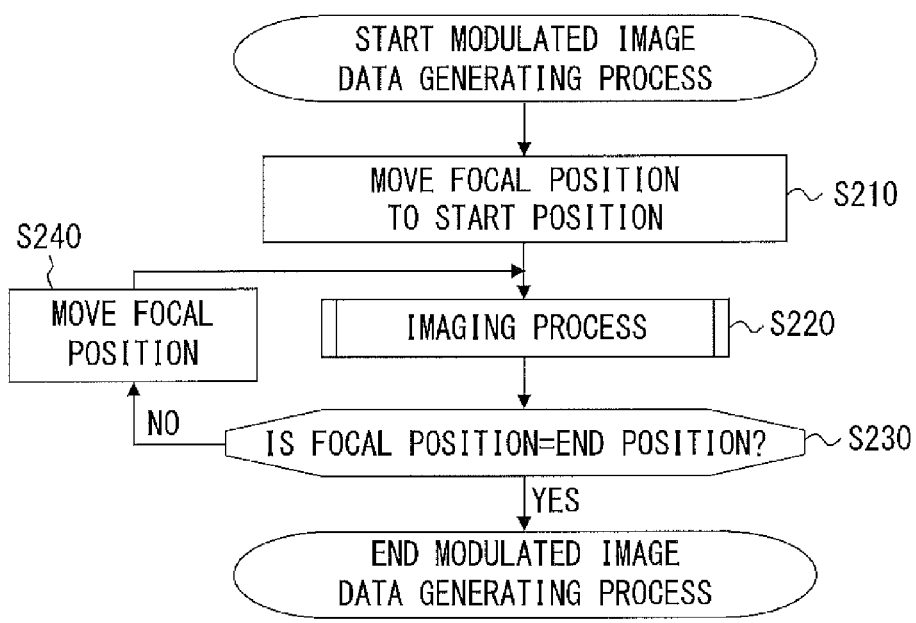
FIG. 22 is a flowchart of a process of generating modulated image data depicted in FIG. 21.
Figure 23:
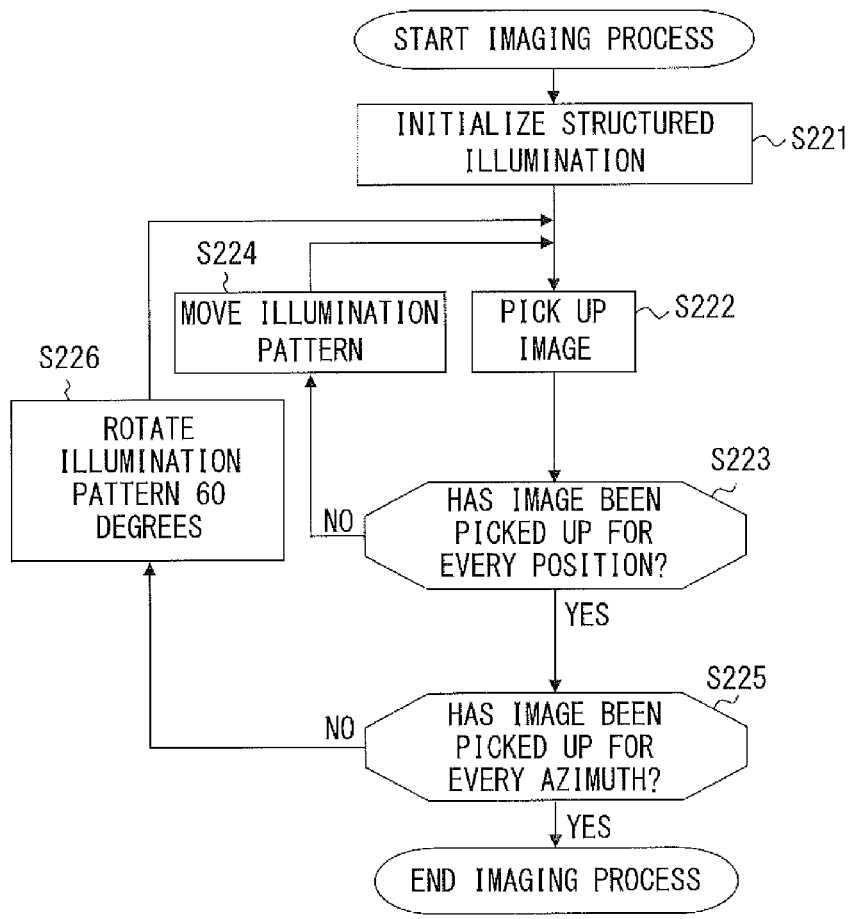
FIG. 23 is a flowchart of an imaging process depicted in FIG. 22.

FIG. 21 is a flowchart of the entirety of processing performed by the apparatus 300 in accordance with the present embodiment. FIG. 22 is a flowchart of a process of generating modulated image data depicted in FIG. 21. FIG. 23 is a flowchart of an imaging process depicted in FIG. 22.

Figure 24:
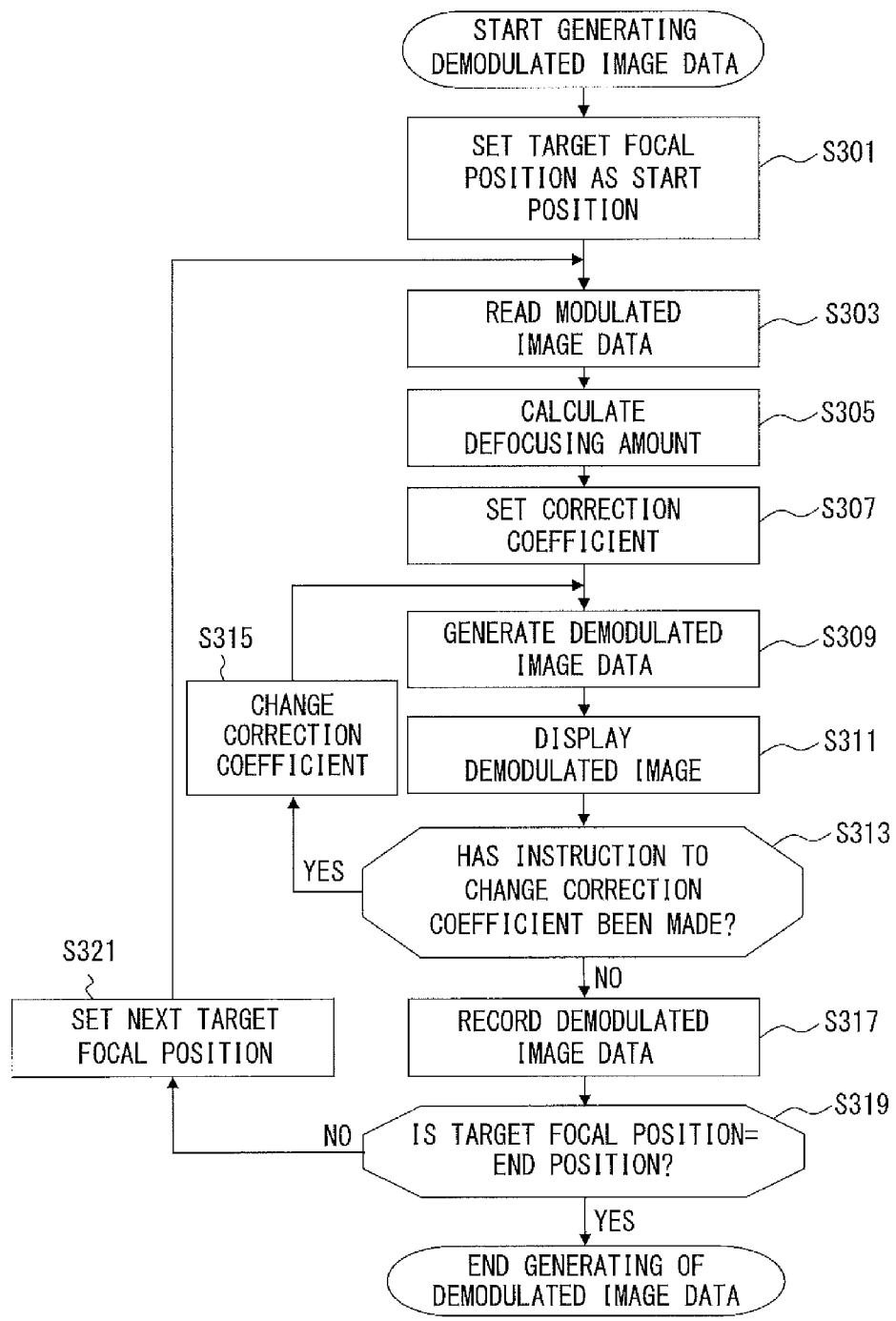
FIG. 24 is a flowchart of a process of generating demodulated image data depicted in FIG. 21.

FIG. 24 is a flowchart of a process of generating demodulated image data depicted in FIG. 21. With reference to FIGS. 21-24, the following will specifically describe how the apparatus 300 in accordance with the present embodiment generates demodulated image data in an exemplary situation in which demodulated image data is generated for each Z position.

After a sample is placed on a stage and the position thereof is adjusted, the apparatus 300 receives input of initial settings (S100). The operational apparatus 311 receives input of, for example, setting information of a correction collar provided at an objective, an excitation wavelength, a fluorescence wavelength, the refractive indexes of the sample and immersion liquid, and lens data of the objective. Input of a start position and end position of the Z position (focal position) and a Z movement distance is also received. The input information is stored in, for example, the memory 313.

After the initial settings are completely input, the apparatus 300 performs the process of generating modulated image data (step S200). The apparatus 300 moves the stage (not illustrated) so as to move the focal position to the start position (step S210), and performs an imaging process (step S220). The movement of the stage is controlled by, for example, the operational apparatus 311.

In the imaging process, the apparatus 300 initializes structured illumination (step S221). In this step, the driving apparatus 302 changes the position and orientation of the diffraction grating 102 back into a reference position and orientation. The driving apparatus 302 is controlled by, for example, a control signal from the operational apparatus 311.

Subsequently, the imaging element 110 picks up a sample image (modulated image) modulated by structured illumination and projected onto the imaging element 110, and the operational apparatus 311 generates modulated image data according to a signal from the imaging element 110 (step S222). In addition, the driving apparatus 302 repeatedly moves and rotates the diffraction grating 102 (steps S223-S226), the imaging element 110 picks up a modulated image for each state, and the operational apparatus 311 generates a total of 21 pieces of modulated image data.

After the imaging process is completed, the apparatus 300 (operational apparatus 311) determines whether the focal position has reached the end position input in step S100 (step S230). When the focal position has not reached the end position, the apparatus 300 moves the stage in the Z direction by the Z movement distance input in step S100 (step S240) and performs the imaging process again (step S220). The processes described above are repeatedly performed until the focal position reaches the end position, so as to complete a modulated data generating process.

After the modulated data generating process is completed, the apparatus 300 performs a demodulated image data generating process (step S300). In one possible example, the processor 312 loads a demodulated image data generating program stored in the storage apparatus 112 into the memory 313 and executes this program so as to perform the demodulated image data generating process.

The operational apparatus 311 sets, as a start position, a focal position for which demodulated image data is to be generated (hereinafter referred to as a "target focal position") (step S301). The operational apparatus 311 reads, from the memory 313, 21 pieces of modulated image data generated when the focal position was located at the target focal position (step S303).

According to various pieces of data input in step S100, the operational apparatus 311 calculates a defocusing amount for the target focal position (i.e., the defocusing amount of structured illumination with reference to the focal plane of the objective 108) (step S305). The various pieces of data are, for example, setting information of a correction collar, an excitation wavelength, the refractive indexes of the sample and immersion liquid, and lens data of the objective. Moreover, according to the defocusing amount, the operational apparatus 311 calculates and sets the correction coefficients expressed by formulae (70) and (71) (step S307).

The operational apparatus 311 generates demodulated image data by calculating demodulated image components according to the 21 pieces of modulated image data read in step S303 and the correction coefficients set in step S307 (step S309). That is, the operational apparatus 311 is a demodulated image data generator that generates demodulated image data according to a plurality of modulated images each picked up by the imaging element 110 when the illumination pattern is located at a different position on the sample with respect to the Z direction and the X direction and according to a defocusing amount of structured illumination.

In step S309, demodulated image data may be generated for each of the azimuths of illumination patterns (i.e., for every seven modulated images). From three pieces of resultant demodulated image data with different azimuths, one piece of demodulated image data may be generated that is essentially isotropic two-dimensionally and from which the influence of the azimuths of the illumination patterns has been eliminated.

The operational apparatus 311 displays a demodulated image on the monitor 113 according to the demodulated image data generated in step S309 (step S311). Accordingly, the user may see the demodulated image displayed on the monitor 113 so as to determine whether the demodulation has been appropriately performed.

When, for example, artifacts have occurred in the demodulated image, the user may determine that the demodulation has been inappropriately performed, and give an instruction for the operational apparatus 311 to change the correction coefficient. When an instruction to change the correction coefficient is made, the operational apparatus 311 changes the correction coefficient (step S315) and regenerates demodulated image data (step S309). That is, the operational apparatus 311 functions as both a demodulated image generator and a demodulated image data regenerator that regenerates demodulated image data.

Repeating the operation above enables generation of demodulated image data with generation of artifacts suppressed even when the accuracy of the defocusing amount calculated in step S305 is low. When the demodulated image data with suppressed artifacts is generated, the operational apparatus 311 records this demodulated image data in the storage apparatus 112 (step S317).

Performing the processes described above for different target focal positions (steps S319 and S321) results in, for each Z position, generation of modulated image data with artifacts suppressed.

Even when structured illumination is defocused relative to a focal plane, the apparatus 300 in accordance with the present embodiment may generate demodulated image data with the influence of the defocusing eliminated. Hence, generation of artifacts within a demodulated image can be suppressed. This means that a constant PSF can be maintained in the generating of demodulated image data, irrespective of whether defocusing is present.

The apparatus 300 is particularly suitable for observing a thick sample. In the observing of a thick sample, the focus position (origin position) of structured illumination changes with the depth of the focal plane (observation plane). Hence, in conventional 3D-SIM, it is extremely difficult to make adjustments to the origin position and focal plane of structured illumination irrespective of the depth. Meanwhile, the apparatus 300 may perform processing in accordance with a defocusing amount in such a manner as to eliminate the influence of defocusing irrespective of the degree of defocusing.

The apparatus 300 can easily make an adjustment in focus of structured illumination. This is because, as long as structured illumination is formed at a focal plane, the apparatus 300 does not need to make the origin position of the structured illumination precisely coincide with the focal plane.

The present embodiment has been described with reference to an example in which, after modulated image data is generated for all Z positions, demodulated image data is generated for each of the Z positions, but the procedure for generating demodulated data is not limited to this. Modulated image data and demodulated image data may be generated for one after another of the Z positions.

The present embodiment has also been described with reference to an example in which the same apparatus (operational apparatus 311) generates modulated image data and demodulated image data, but modulated image data and demodulated image data may be generated by different apparatuses.

The present embodiment has also been described with reference to an example in which an illumination pattern moves each time in the X direction and the Z direction 1/7 of the basic cycles with reference to the X direction and Z direction, but the illumination pattern may move less than 1/7 of the basic cycles each time. This is because, as long as as many modulated images as, or more modulated images than, the number of modulated image components (i.e., 7) are picked up, the operational apparatus 311 can separate the modulated images into modulated image components to which frequency shifting has been applied in different directions, and can demodulate the modulated image components so as to calculate demodulated image components. When more modulated images than the number of modulated image components are picked up, the modulated image components can be separated while suppressing errors using the method of least squares, and the accuracy of the solutions of the modulated image components can be evaluated.

In the present embodiment, as long as the phase of an illumination pattern changes after the illumination pattern moves, the illumination pattern may move more than 1/7 of the basic cycles each time. For example, the illumination pattern may be moved 2/7 of the basic cycles each time so as to pick up seven or more modulated images.

Embodiment 2

Figure 25:
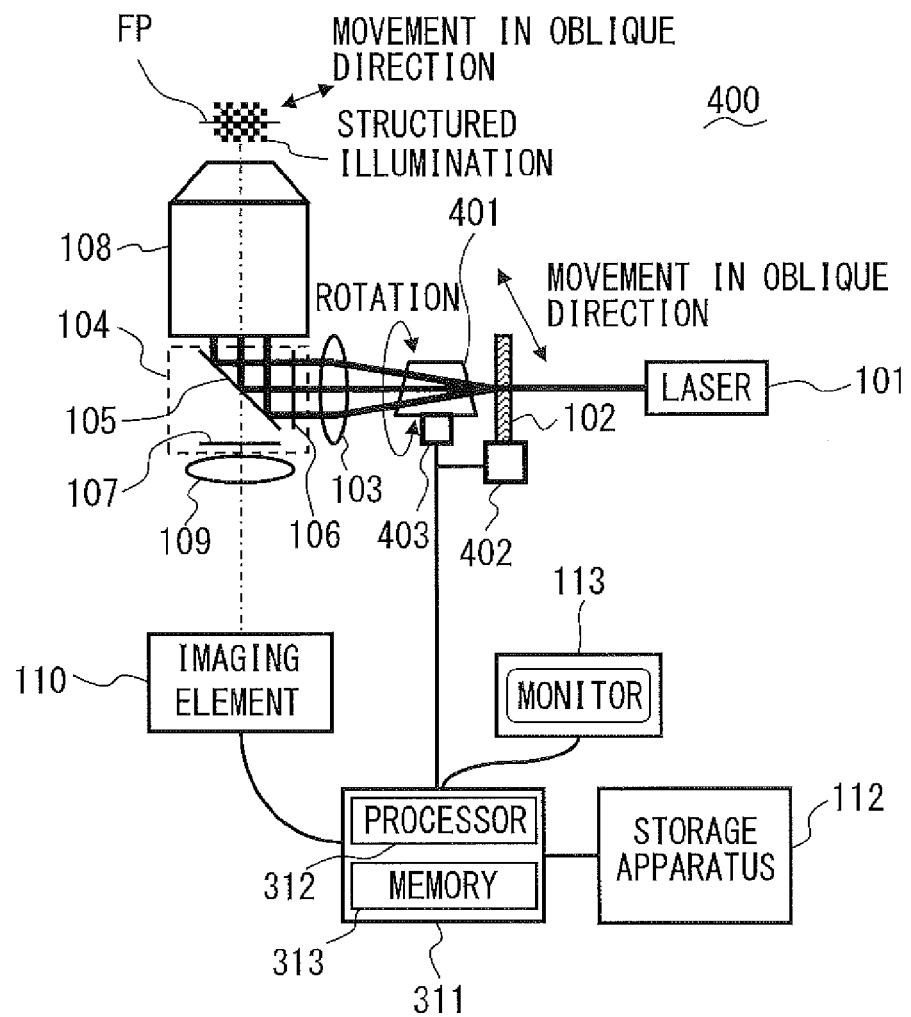
FIG. 25 illustrates the configuration of an apparatus in accordance with embodiment 2.

FIG. 25 illustrates the configuration of an apparatus 400 used in R3D-SIM in accordance with the present embodiment. The apparatus 400 is a sample image data generating apparatus that, according to the R3D-SIM described above, generates sample image data having a super-resolution three-dimensionally.

The apparatus 400 is different from the apparatus 300 in accordance with embodiment 1 depicted in FIG. 20 in the sense that the apparatus 400 includes a rotatable image rotator 401 and a driving apparatus 403 and that the apparatus 400 includes a driving apparatus 402 instead of the driving apparatus 302. The other components of the apparatus 400 are similar to those of the apparatus 300 and are given like reference marks, and descriptions thereof are omitted herein.

In the apparatus 400, the driving apparatus 403 rotates the image rotator 401 so as to change the azimuth of an illumination pattern (the azimuth of interference fringes) sixty degrees each time. Meanwhile, the movement of the illumination pattern in the X direction and the Z direction results from the driving apparatus 402 moving the diffraction grating 102 in an oblique direction on a specified-amount by specified-amount basis.

Accordingly, as with the apparatus 300 in accordance with embodiment 1, the apparatus 400 can pick up 21 modulated images (3 azimuths×7 positions) for each Z position, and generate demodulated image data. Hence, the apparatus 400 may achieve an advantage similar to the advantage achieved by the apparatus 300 in accordance with embodiment 1.

In the present embodiment, the image rotator 401 is located between the diffraction grating 102 and the illumination lens 103, but, as long as the image rotator 401 is located closer to a sample than the diffraction grating 102 is, any arrangement can be used.

In the present embodiment, the azimuth of an illumination pattern is changed by rotating the image rotator 401, but various methods may be used to change the azimuth.

Instead of the image rotator 401 and the driving apparatus 403, the apparatus 400 may include two galvanometer mirrors (galvanometer mirrors 410 and 420) that cooperatively switch between a plurality of image rotators (image rotators 411, 412, and 413) having different rotation angles depicted in FIG. 26. The azimuth of the illumination pattern may be changed by switching between the image rotators for an image rotator on which three light beams from the diffraction grating 102 are to be incident. In this configuration, although not illustrated, an adjustment is made to equalize the lengths of optical paths passing through the individual image rotators. This configuration enables the shortening of the time required to change the azimuth of the illumination pattern in comparison with a situation in which the image rotator 401 rotates. In addition, the reproducibility of the azimuth of the illumination pattern may be improved.

In the present embodiment, the diffraction grating 102 divides laser light emitted from the laser 101 into three light beams, but various methods may be used to divide laser light.

Figure 27:
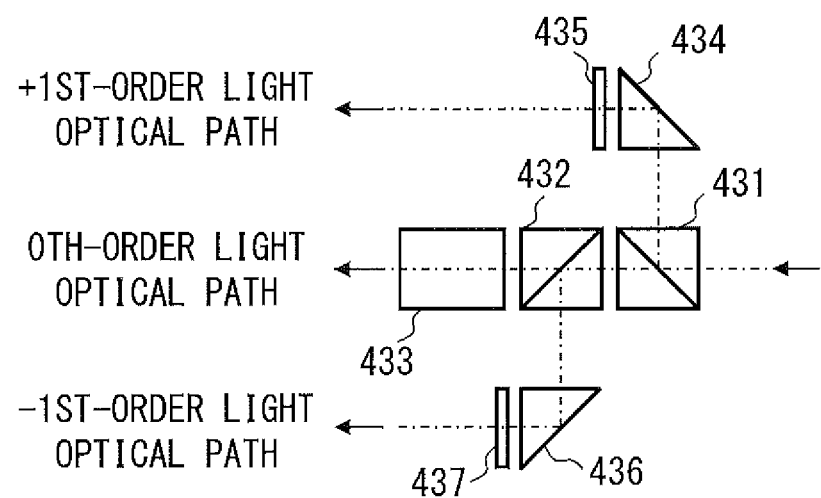
FIG. 27 illustrates a configuration in which laser light is divided using a polarizing beam splitter.

Instead of the diffraction grating 102, the apparatus 400 may include a non-polarized beam splitter (hereinafter referred to as an NPBS) depicted in FIG. 27 to divide laser light into three light beams. In this configuration, NPBSs 431 and 432 divide laser light into three light beams at a predetermined light quantity ratio. In addition, a half-wavelength plate 435 makes a polarization direction of a light beam reflected from a total reflection prism 434 coincide with 0th-order light. An optical path length adjustment prism 433 adjusts the optical path length of a light beam that has passed through a beam splitter 432. A half-wavelength plate 437 makes a polarization direction of a light beam reflected from a total reflection prism 436 coincide with 0th-order light. Consequently, three coherent light beams are formed in an identical phase and polarization direction.

Figure 28:
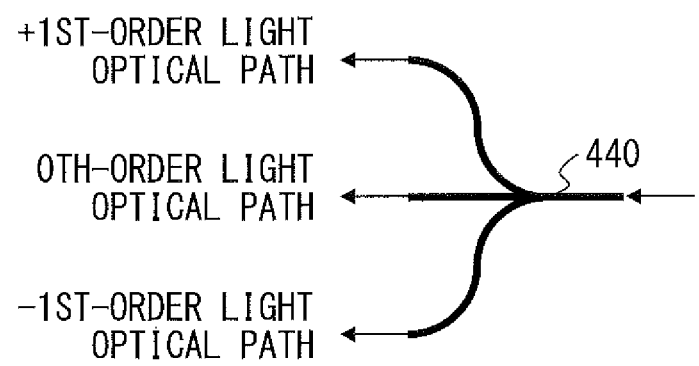
FIG. 28 illustrates a configuration in which laser light is divided using an optical fiber.

The apparatus 400 may divide laser light into three light beams using an optical fiber 440 depicted in FIG. 28 instead of the diffraction grating 102. Note that the optical fiber 440 is configured in a manner such that three emitted light beams have a constant polarization direction.

Embodiment 3

FIG. 29 illustrates the configuration of an apparatus 500 used in R3D-SIM in accordance with the present embodiment. The apparatus 500 is a sample image data generating apparatus that, according to the R3D-SIM described above, generates sample image data having a super resolution three-dimensionally.

The apparatus 500 is different from the apparatus 300 in accordance with embodiment 1 depicted in FIG. 20 in the sense that the apparatus 500 includes: a two-dimensional diffraction grating 501 fixed on an optical path, instead of the diffraction grating 102 and the driving apparatus 302; a phase difference generation plate 502 and a driving apparatus 504 between the two-dimensional diffraction grating 501 and the illumination lens 103; and a light beam selector 503. The other components of the apparatus 500 are similar to those of the apparatus 300 and are given like reference marks, and descriptions thereof are omitted herein.

Figure 30A:
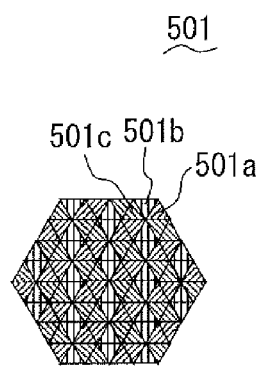

The two-dimensional diffraction grating 501 consists of three types of regions (regions 501a, 501b, and 501c) differently grooved as depicted in FIG. 30A. Accordingly, the two-dimensional diffraction grating 501 divides laser light into a total of seven light beams. That is, the two-dimensional diffraction grating 501 functions as a light beam generator that generates seven light beams to be incident on the objective 108 from laser light emitted from the laser 101 (coherent light).

Figure 30B:
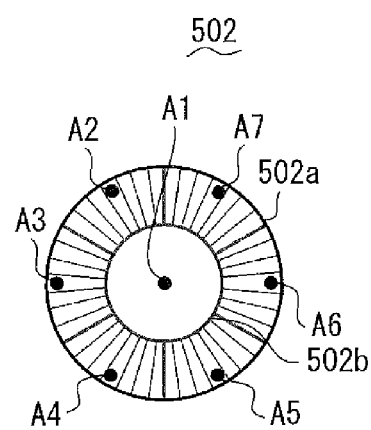
Figure 30C:
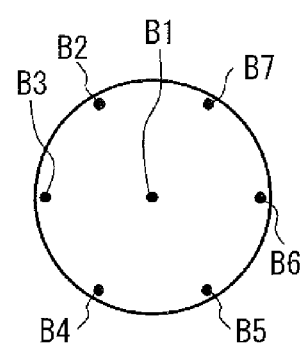

The phase difference generation plate 502 functions as a pattern shifter that moves an illumination pattern by making different phase differences between seven light beams from the two-dimensional diffraction grating 501, and is desirably located at, or close to, a pupil-conjugate position of the objective 108. The seven light beams are incident from a position A1 on the phase difference generation plate 502 depicted in FIG. 30B onto a position A7 thereon. The seven light beams may be incident from a position B1 on a pupil plane of the objective 108 depicted in FIG. 30C to a position B7 thereon.

The phase difference generation plate 502 is a circular plate with a rotational axis parallel to a direction in which a light beam incident on the position A1 travels. The phase difference generation plate 502 includes: a first region 502a that includes a plurality of minute regions which are arranged in a circumferential direction and which each generate a different phase difference; and a second region 502b that includes the position A1. The driving apparatus 504 rotates the phase difference generation plate 502 in a manner such that different regions affect a light beam incident on each of the positions A2-A7, with the result that a phase difference generated at each of the light beams changes.

The second region 502b is close to a rotation center of the phase difference generation plate 502, and, even while the phase difference generation plate 502 is rotating, a light beam that has been incident on the position A1 has a constant phase.

The light beam selector 503 selects and allows passage of three light beams from among the seven light beams from the two-dimensional diffraction grating 501. In one possible example, the light beam selector 503 includes a light shield plate; and by changing the position of the light shield plate, the light beam selector 503 allows passage of one light beam that has passed through the position A1 and two light beams that have passed through two positions that are symmetrical with respect to the position A, and blocks the other four light beams.

In the apparatus 500, the light beam selector 503 switches between three light beams for a light beam to be incident on the pupil plane of the objective 108, so as to change the azimuth of an illumination pattern 60 degrees each time. Meanwhile, the movements of the illumination pattern in the X direction and the Z direction are achieved by rotating the phase difference generation plate 502 in such a manner as to change phase differences between three light beams incident on the pupil plane.

Accordingly, as with the apparatus 300 in accordance with embodiment 1, the apparatus 500 can pick up 21 (3 azimuths×7 positions) modulated images for each Z position, and generate demodulated image data. Hence, the apparatus 500 may achieve an advantage similar to the advantage achieved by the apparatus 300 in accordance with embodiment 1.

In the present embodiment, the light beam selector 503 is located between the phase difference generation plate 502 and the illumination lens 103, but, as long as the light beam selector 503 is located between the phase difference generation plate 502 and the pupil plane of the objective 108, any arrangement can be used. A portion of the phase difference generation plate 502 may function as a light shield plate so that the light beam selector 503 can be omitted.

In the present embodiment, the azimuth of an illumination pattern is moved in the X direction and the Z direction by rotating the phase difference generation plate 502, but various methods may be used to move the illumination pattern. The apparatus 500 may include a phase difference generating apparatus depicted in FIGS. 31-35 instead of the phase difference generation plate 502. In this case, it is desirable that at least two phase difference generating apparatuses be provided to generate phase differences between three light beams incident on the pupil plane of the objective 108.

Figure 31:
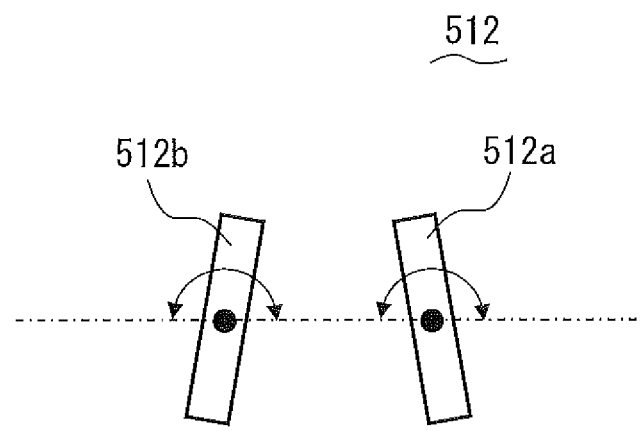
FIG. 31 illustrates the configuration of a phase difference generation apparatus composed of two parallel flat plates.

In a phase difference generating apparatus 512 depicted in FIG. 31, two parallel flat plates (parallel flat plates 512a and 512b) each having a rotational axis orthogonal to a direction in which incident light travels change their inclinations, thereby changing a phase difference generated in transmitted light. As long as the two parallel flat plates 512a and 512b are the same in thickness and each rotate in an opposite direction, the optical axis of transmitted light does not move even when the phase difference changes.

Figure 32:
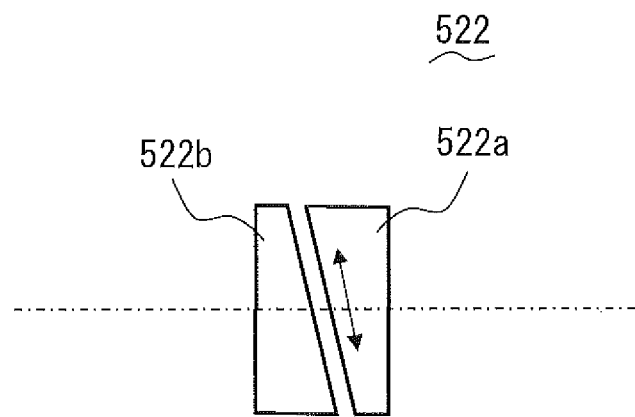
FIG. 32 illustrates the configuration of a phase difference generation apparatus composed of two wedge-shaped prisms.

In a phase difference generating apparatus 522 depicted in FIG. 32, at least one of two wedge-shaped prisms (wedge-shaped prisms 522a and 522b) moves relative to incident light, thereby changing a phase difference generated in transmitted light. This configuration allows the phase difference to be continuously generated with a high degree of freedom.

Figure 33:
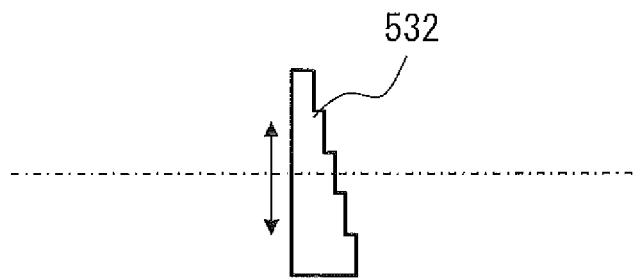
FIG. 33 illustrates the configuration of a phase difference generation apparatus that is a step-wise prism.

With reference to a phase difference generating apparatus 532, i.e., a step-wise prism depicted in FIG. 33, movement of the prism changes the step of incidence of incident light in such a manner as to change a phase difference generated in transmitted light. The apparatus may accurately generate a determined phase difference.

Figure 34:
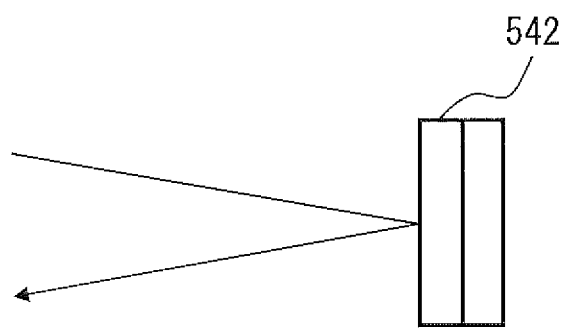
FIG. 34 illustrates the configuration of a phase difference generation apparatus that is a piezo mirror.

A phase difference generating apparatus 542 depicted in FIG. 34 is a piezo mirror. This apparatus may rapidly adjust a phase difference.

Figure 35:
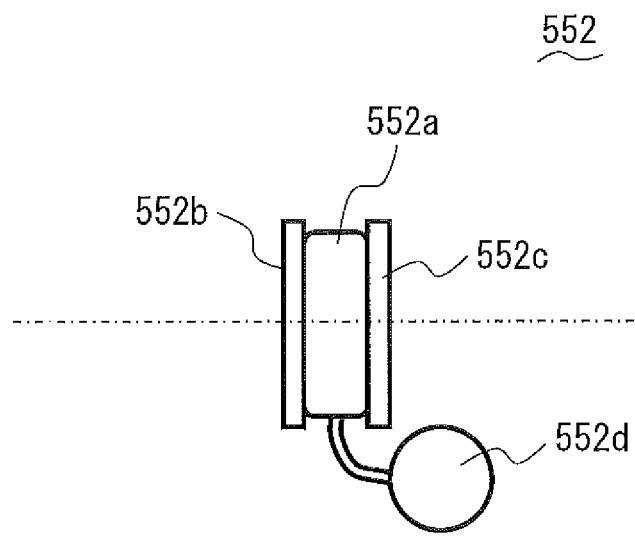
FIG. 35 illustrates the configuration of a phase difference generation apparatus that is a fluid prism.

A phase difference generating apparatus 552 depicted in FIG. 35 is a fluid prism with a fluid 552a confined within a region sandwiched by two parallel flat plates (parallel flat plates 552b and 552c). In the phase difference generating apparatus 552, a pump 552d changes the thickness of the prism by adjusting the amount of the fluid, resulting in a change in a phase difference generated in transmitted light.

Embodiment 4

Figure 36:
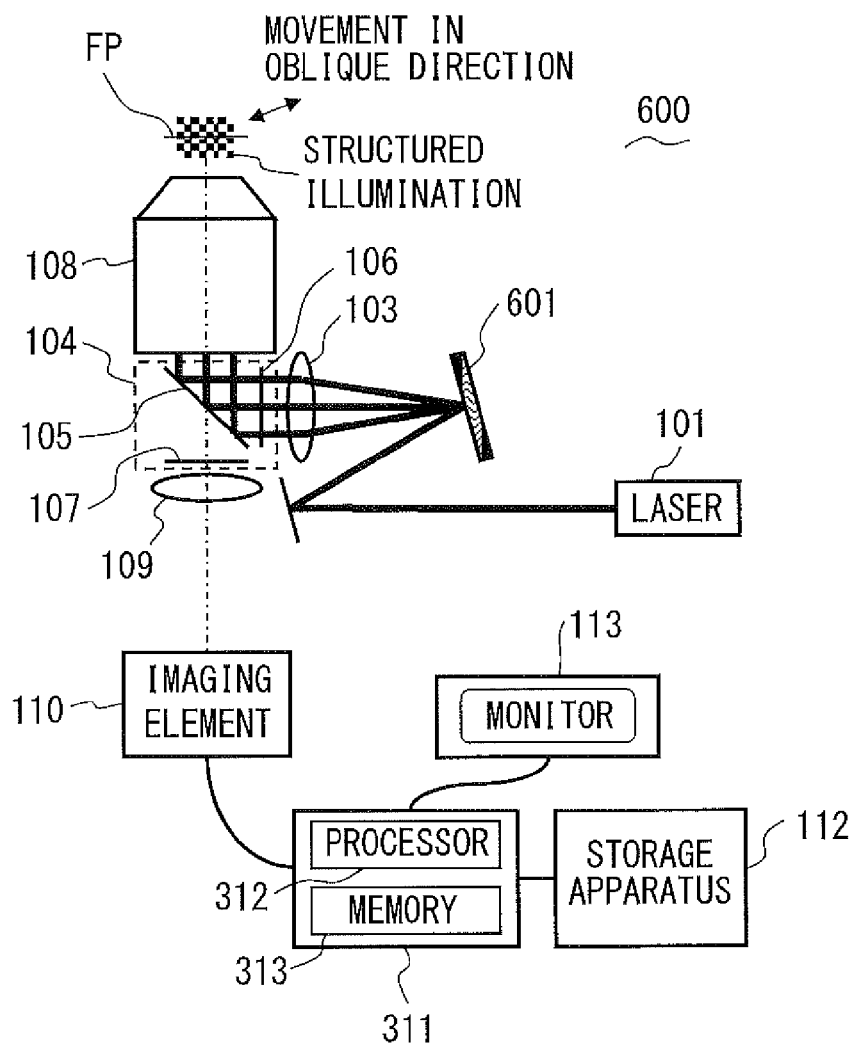
FIG. 36 illustrates the configuration of an apparatus in accordance with embodiment 4.

FIG. 36 illustrates the configuration of an apparatus 600 used in R3D-SIM in accordance with the present embodiment. The apparatus 600 is a sample image data generating apparatus that generates, through the R3D-SIM described above, sample image data having a super resolution three-dimensionally.

The apparatus 600 is different from the apparatus 300 in accordance with embodiment 1 depicted in FIG. 20 in the sense that the apparatus 600 includes a spatial light modulator 601 (hereinafter referred to as an SLM) instead of the diffraction grating 102 and the driving apparatus 302. The other components of the apparatus 600 are similar to those of the apparatus 300 and are given like reference marks, and descriptions thereof are omitted herein.

The SLM 601 is an apparatus consisting of a plurality of light modulation elements which are each capable of being controlled independently. The SLM 601 may be an intensity-modulation-oriented SLM that includes a plurality of minute mirrors, e.g., DMD®, or may be a phase-modulation-oriented SLM that includes a plurality of liquid crystal regions, e.g., LCOS®. In addition, the SLM 601 may be an apparatus that modulates light according to Faraday rotation, e.g., MOSLM (magnetooptical spatial light modulator).

In the apparatus 600, a light modulation pattern of the SLM 601 is controlled to change the azimuth of an illumination pattern and move the illumination pattern in the X direction and the Z direction.

Accordingly, as with the apparatus 300 in accordance with embodiment 1, the apparatus 600 can pick up 21 (3 azimuths×7 positions) modulated images for each Z position, and generate demodulated image data. Hence, the apparatus 600 may achieve an advantage similar to the advantage achieved by the apparatus 300 in accordance with embodiment 1.

The embodiments described above provide specific examples to facilitate understanding of the present invention, which are not limited to such embodiments. The sample image data generating apparatus and method described with reference to each of the embodiments can be varied or changed in various ways without departing from the idea of the invention defined in the claims.

What is claimed is:

1. A sample image data generating apparatus comprising:
a modulated image imager configured to pick up a modulated image that is a sample image modulated by structured illumination forming an illumination pattern having a periodic structure in an optical axis direction of an objective and an orthogonal direction orthogonal to the optical axis direction; and
a demodulated image data generator configured to generate demodulated image data by calculating a demodulated image according to a plurality of modulated images each picked up by the modulated image imager when an origin position of an intensity distribution of the illumination pattern is located at a different position on a sample with respect to the optical axis direction and the orthogonal direction and according to a defocusing amount of the structured illumination with reference to a focal plane of the objective, the demodulated image being a sample image obtained by demodulating the modulated image,
wherein the demodulated image data generator demodulates, into a plurality of demodulated image components, a plurality of modulated image components which are included in a modulated image, to which frequency shifting has been applied in different directions by the structured illumination, and which include a modulated image component that has undergone frequency shifting in the optical axis direction, according to more modulated images than a number of the plurality of modulated image components and a coefficient based on the defocusing amount, the more modulated images being images each picked up by the modulated image imager when the origin position of the intensity distribution of the illumination pattern is located at a different position on the sample with respect to the optical axis direction and the orthogonal direction.

2. The sample image data generating apparatus according to claim 1, further comprising:
a pattern shifter configured to move the origin position of the intensity distribution of the illumination pattern in the optical axis direction and the orthogonal direction with respect to the sample.

3. The sample image data generating apparatus according to claim 2, further comprising:
a pattern generator that includes the objective, the pattern generator being configured to form the illumination pattern on the sample according to interference between at least three light beams incident on the objective.

4. The sample image data generating apparatus according to claim 3, wherein
the pattern generator includes a light beam generator that generates the at least three light beams incident on the objective from coherent light emitted from a light source, and
the pattern shifter moves the light beam generator.

5. The sample image data generating apparatus according to claim 3, wherein
the pattern generator includes a light beam generator that generates the at least three light beams incident on the objective from coherent light emitted from a light source, and
the pattern shifter makes phase differences between the at least three light beams generated by the light beam generator.

6. The sample image data generating apparatus according to claim 1, wherein the demodulated image data generator calculates the demodulated image by linearly combining the plurality of demodulated image components.

7. The sample image data generating apparatus according to claim 1, further comprising:
a display configured to display, according to the demodulated image data, the demodulated image calculated by the demodulated image data generator; and
a demodulated image data regenerator that regenerates demodulated image data by changing the coefficient.

8. A sample image data generating method comprising:
moving an illumination pattern in an optical axis direction of an objective and an orthogonal direction orthogonal to the optical axis direction, the illumination pattern having a periodic structure in the optical axis direction and the orthogonal direction;
picking up a modulated image that is a sample image modulated by structured illumination forming the illumination pattern; and generating demodulated image data by calculating a demodulated image according to a plurality of modulated images each picked up when an origin position of an intensity distribution of the illumination pattern is located at a different position on a sample with respect to the optical axis direction and the orthogonal direction and according to a defocusing amount of the structured illumination with reference to a focal plane of the objective, the demodulated image being a sample image obtained by demodulating the modulated image, wherein the generating demodulated image data includes:
demodulating, into a plurality of demodulated image components, a plurality of modulated image components which are included in a modulated image, to which frequency shifting has been applied in different directions by the structured illumination, and which include a modulated image component that has undergone frequency shifting in the optical axis direction, according to more modulated images than a number of the plurality of modulated image components and a coefficient based on the defocusing amount, the more modulated images being images each picked up when the origin position of the intensity distribution of the illumination pattern is located at a different position on the sample with respect to the optical axis direction and the orthogonal direction.

9. A sample image data generating apparatus comprising:
a modulated image imager configured to pick up a modulated image that is a sample image modulated by structured illumination forming an illumination pattern having a periodic structure in an optical axis direction of an objective and an orthogonal direction orthogonal to the optical axis direction;
a demodulated image data generator configured to generate demodulated image data by calculating a demodulated image according to a plurality of modulated images each picked up by the modulated image imager when an origin position of an intensity distribution of the illumination pattern is located at a different position on a sample with respect to the optical axis direction and the orthogonal direction and according to a defocusing amount of the structured illumination with reference to a focal plane of the objective, the demodulated image being a sample image obtained by demodulating the modulated image;
a pattern shifter configured to move the origin position of the intensity distribution of the illumination pattern in the optical axis direction and the orthogonal direction with respect to the sample; and
a pattern generator that includes the objective, the pattern generator being configured to form the illumination pattern on the sample according to interference between at least three light beams incident on the objective, wherein:
the pattern generator includes a light beam generator that generates the at least three light beams incident on the objective from coherent light emitted from a light source, and
the pattern shifter moves the light beam generator.

10. A sample image data generating apparatus comprising:
a modulated image imager configured to pick up a modulated image that is a sample image modulated by structured illumination forming an illumination pattern having a periodic structure in an optical axis direction of an objective and an orthogonal direction orthogonal to the optical axis direction;
a demodulated image data generator configured to generate demodulated image data by calculating a demodulated image according to a plurality of modulated images each picked up by the modulated image imager when an origin position of an intensity distribution of the illumination pattern is located at a different position on a sample with respect to the optical axis direction and the orthogonal direction and according to a defocusing amount of the structured illumination with reference to a focal plane of the objective, the demodulated image being a sample image obtained by demodulating the modulated image;
a pattern shifter configured to move the origin position of the intensity distribution of the illumination pattern in the optical axis direction and the orthogonal direction with respect to the sample; and
a pattern generator that includes the objective, the pattern generator being configured to form the illumination pattern on the sample according to interference between at least three light beams incident on the objective, wherein
the pattern generator includes a light beam generator that generates the at least three light beams incident on the objective from coherent light emitted from a light source, and
the pattern shifter makes phase differences between the at least three light beams generated by the light beam generator.

* * * * *